United States Patent [19]

Manabe et al.

[11] Patent Number: 5,783,818
[45] Date of Patent: Jul. 21, 1998

[54] INTEGRATED TYPE OPTICAL PICKUP HAVING PACKAGING WITH GAS-TIGHT SEAL

[75] Inventors: Seiji Manabe, Yamaga; Mikio Tomisaki, Chikushino; Shigeki Takeuchi, Yamaga; Tatsuya Hiwatashi, Kumamoto-ken; Kazuhisa Ide, Tamana; Toshihiro Koga; Makoto Okazaki, both of Kumamoto-ken; Kazuyuki Nakashima, Fukuoka; Sumio Tate, Kasuga, all of Japan

[73] Assignee: Matsushita Electric Industrial Co., Ltd., Osaka, Japan

[21] Appl. No.: 641,643

[22] Filed: May 1, 1996

[30] Foreign Application Priority Data

| May 8, 1995 | [JP] | Japan | 7-109289 |
| May 31, 1995 | [JP] | Japan | 7-133312 |
| Jun. 28, 1995 | [JP] | Japan | 7-161823 |
| Jul. 11, 1995 | [JP] | Japan | 7-174667 |
| Jul. 20, 1995 | [JP] | Japan | 7-183740 |
| Jul. 26, 1995 | [JP] | Japan | 7-190162 |
| Jul. 26, 1995 | [JP] | Japan | 7-190170 |
| Sep. 29, 1995 | [JP] | Japan | 7-253144 |
| Sep. 29, 1995 | [JP] | Japan | 7-253158 |

[51] Int. Cl.$^6$ ............................................. H01J 5/02
[52] U.S. Cl. ............... 250/239; 250/216; 257/433; 369/44.14
[58] Field of Search ............... 250/239, 201.5, 250/216, 208.1; 257/682, 680, 678, 684, 433, 434, 436; 369/112, 414.23, 44.14; 359/15, 19

[56] References Cited

U.S. PATENT DOCUMENTS

| 3,737,667 | 6/1973 | Babb et al. | 250/239 |
| 4,788,421 | 11/1988 | Ogawa et al. | 250/201.5 |
| 5,198,916 | 3/1993 | Kim | 359/15 |
| 5,604,606 | 2/1997 | Miyashita et al. | 250/208.1 |

*Primary Examiner*—Que Le
*Attorney, Agent, or Firm*—Stevens, Davis, Miller & Mosher, L.L.P.

[57] ABSTRACT

In an optical pickup, an optical guide member is provided in an optical path of light from a light source, and has a plurality of inclined surfaces inclined with respect to a light beam emitted from the light source. A light-receiving element is provided for receiving light and for converting the received light into an electrical signal. The optical guide member and the light-receiving element are contained in a packaging member. The light beam from the light source is reflected by the plurality of inclined surfaces of the optical guide member, and then are directed to a recording medium. The reflected light from the recording medium is directed to the light-receiving element. At least one of dry air and inert gas such as nitrogen gas is charged in the interior of the packaging member at a pressure of 0.5 atm to 1.5 atm, thereby preventing the optical characteristics from being degraded.

12 Claims, 17 Drawing Sheets

5,783,818

1

INTEGRATED TYPE OPTICAL PICKUP HAVING PACKAGING WITH GAS-TIGHT SEAL

BACKGROUND OF THE INVENTION

This invention relates to an optical pickup for recording and reproducing information on an optical element, an optical disk or the like.

It has heretofore been desired to reduce the size of an optical disk unit capable of recording and reproducing information using a laser beam, and accordingly the number of optical components has been decreased so as to attempt achieving a compact and lightweight design of an optical pickup. The compact and lightweight design of the optical pickup contributes not only to the reduced overall size of the optical disk unit but also to an improved performance such as shortened access time. Recently, it has been proposed, for example, in U.S. Pat. No. 5,198,916, to use a hologram optical pickup in order to achieve a compact and lightweight design of an optical pickup, and some of such proposals have been put into practical use.

In such a conventional construction, however, the distance from a light source to a recording medium is long, and many independent or separate optical members are arranged between the two, and therefore a compact packaging of the optical pickup has been limited. Another problem is that since the optical members are in direct contact with the ambient air, reflection and diffraction characteristics of the optical members are deteriorated by dirt and condensation deposited on the surfaces of the optical members.

SUMMARY OF THE INVENTION

It is an object of this invention to provide an optical pickup which is packaged into a small size.

According to the present invention, there is provided an optical pickup comprising:

a light source;

an optical guide member having a plurality of inclined surfaces inclined with respect to light emitted from the light source;

light-receiving means for receiving light and for converting the received optical signal into an electrical signal; and a packaging member containing the light source, the optical guide member and the light-receiving means;

wherein the light from the light source is reflected by the plurality of inclined surfaces of the optical guide member to be directed to a recording medium, and the reflected light from the recording medium is directed to the light-receiving means through the optical guide member.

2

Figure 1:
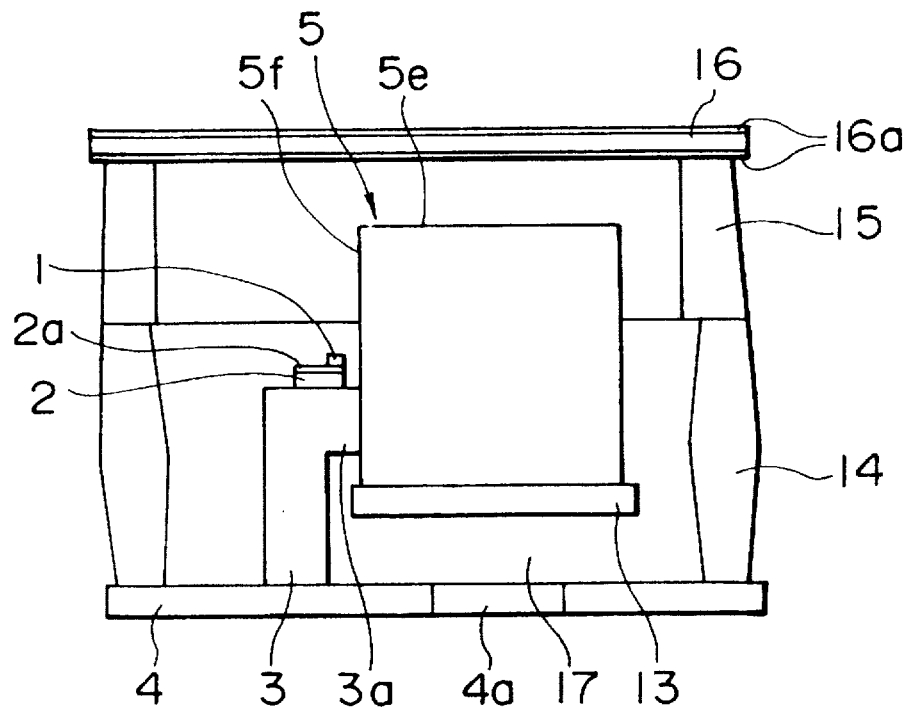
FIG. 1 is a cross-sectional view showing a packaging construction of an optical pickup according to an embodiment of the invention.
Figure 6:
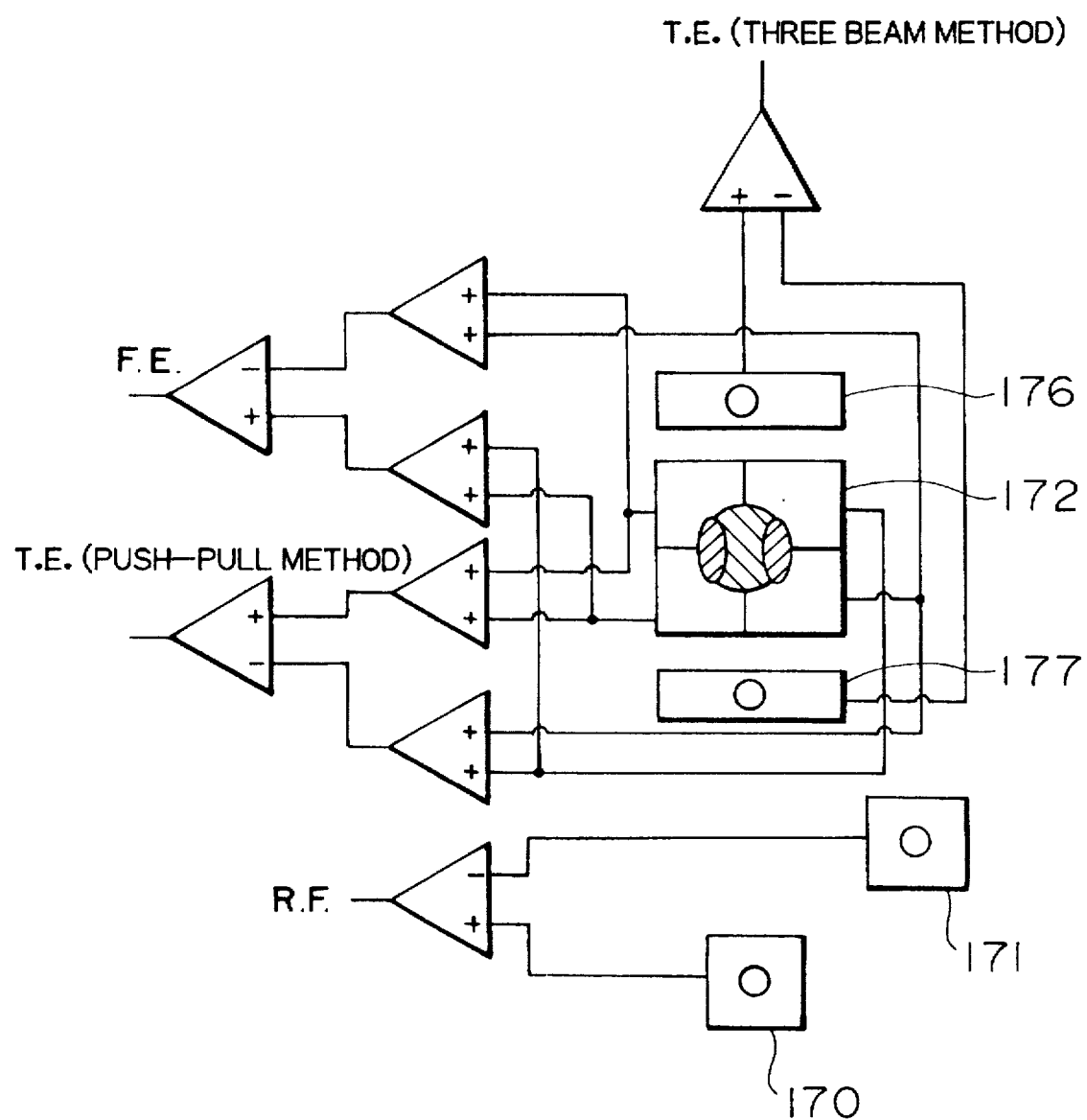
Figure 7:
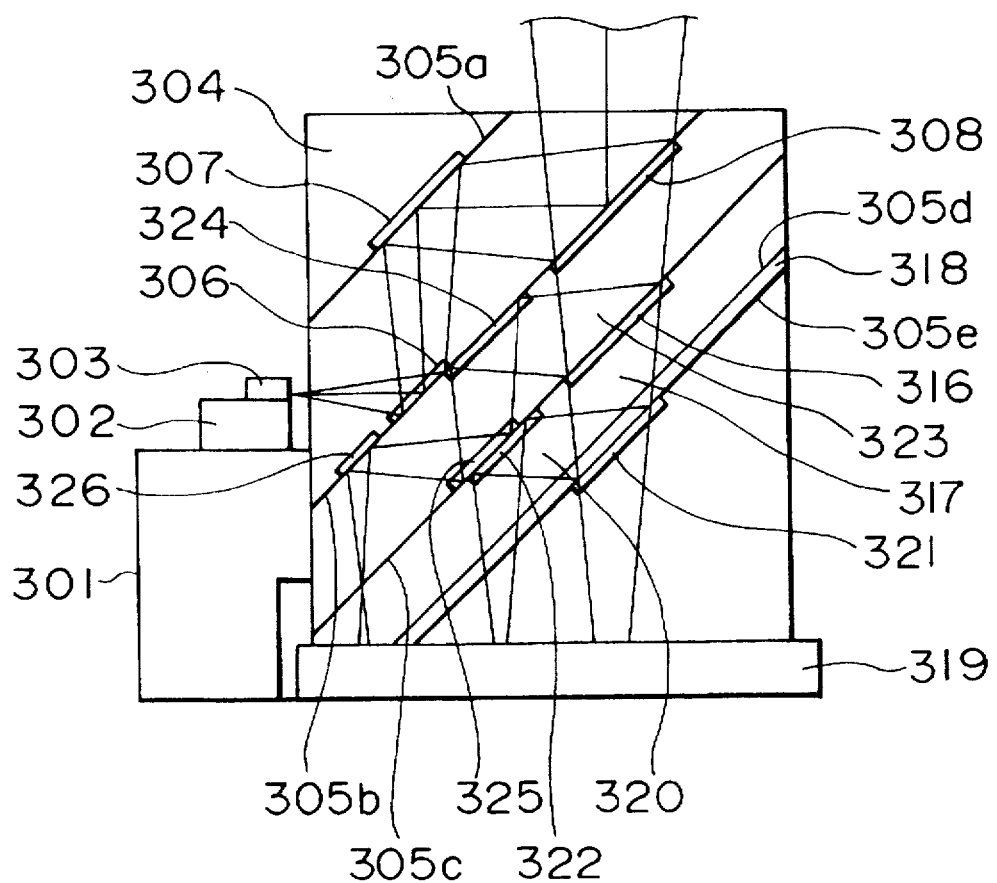
Figure 8:
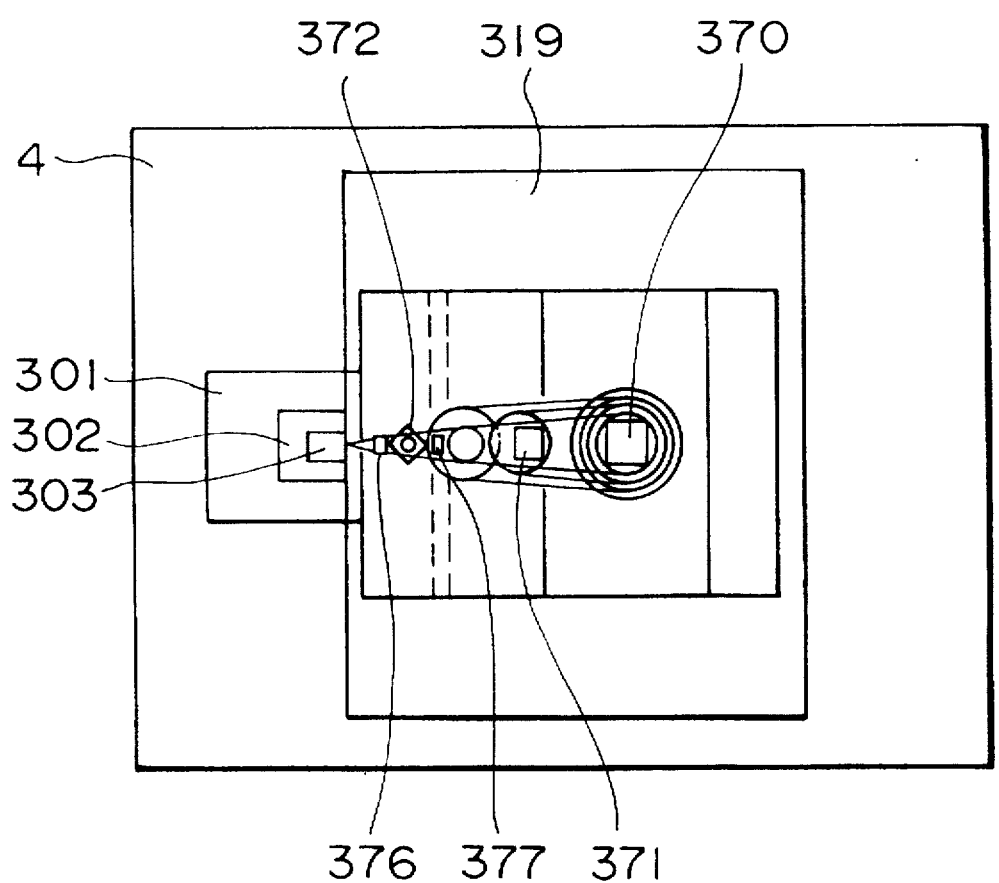
Figure 9:
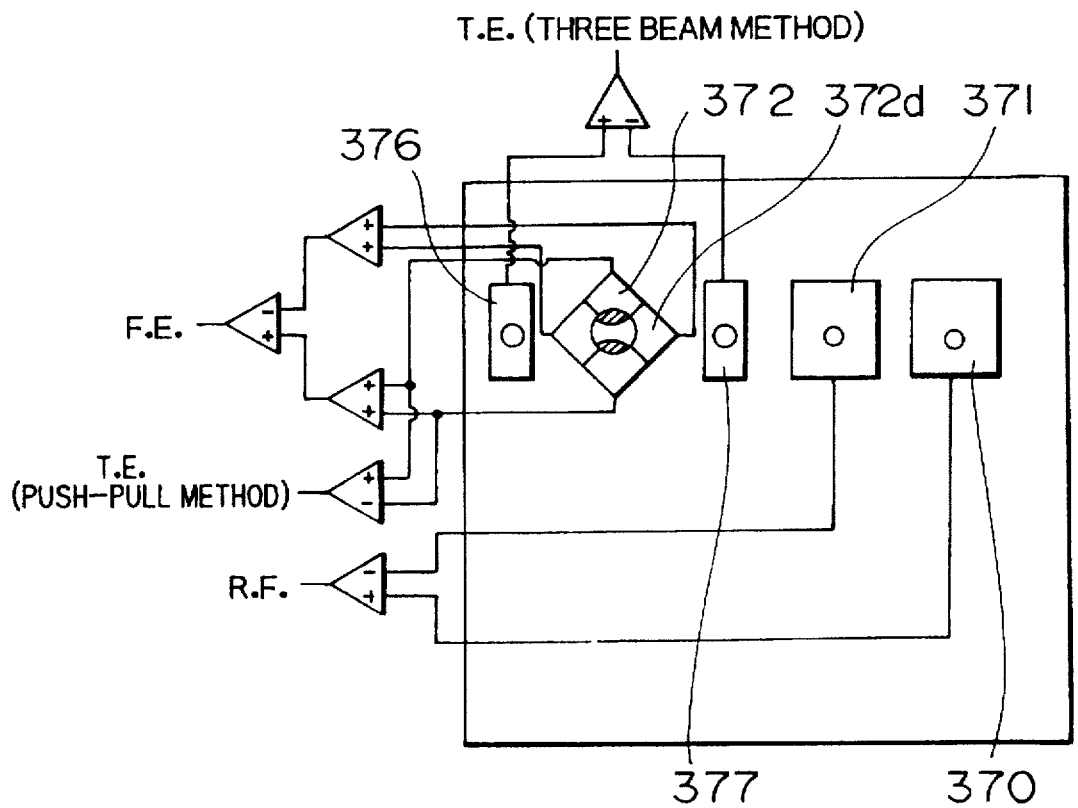
Figure 10:
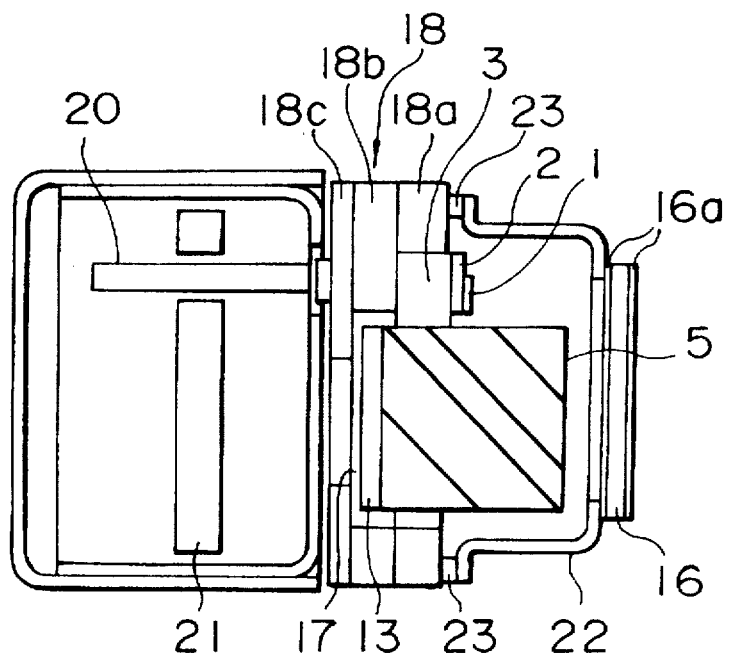
Figure 11:
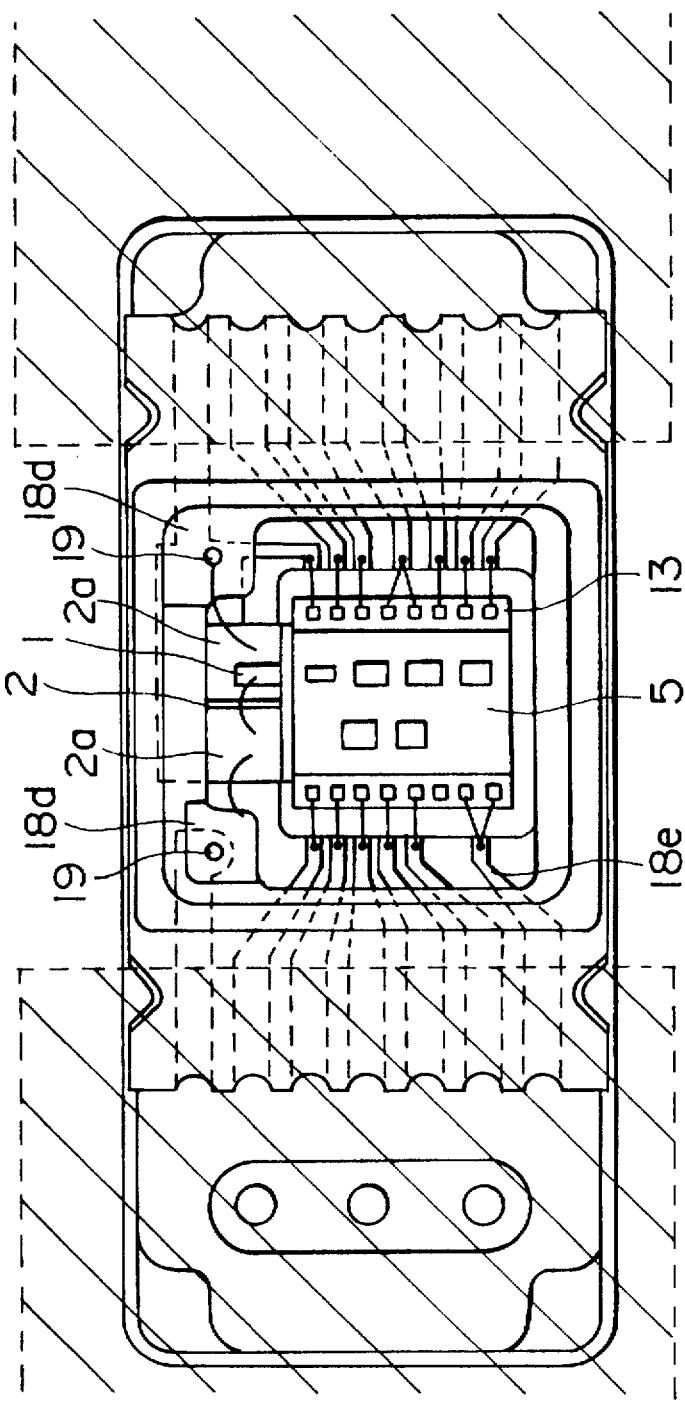
Figure 12:
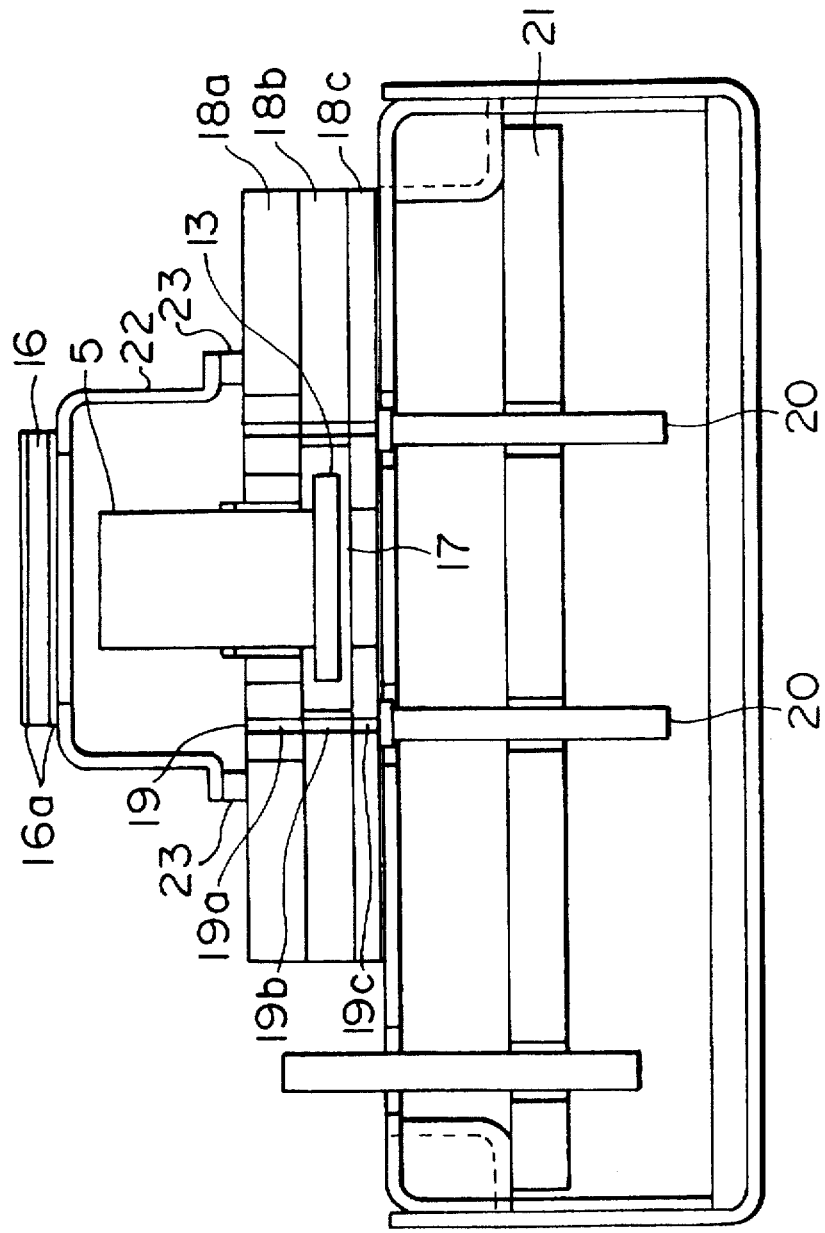
Figure 13:
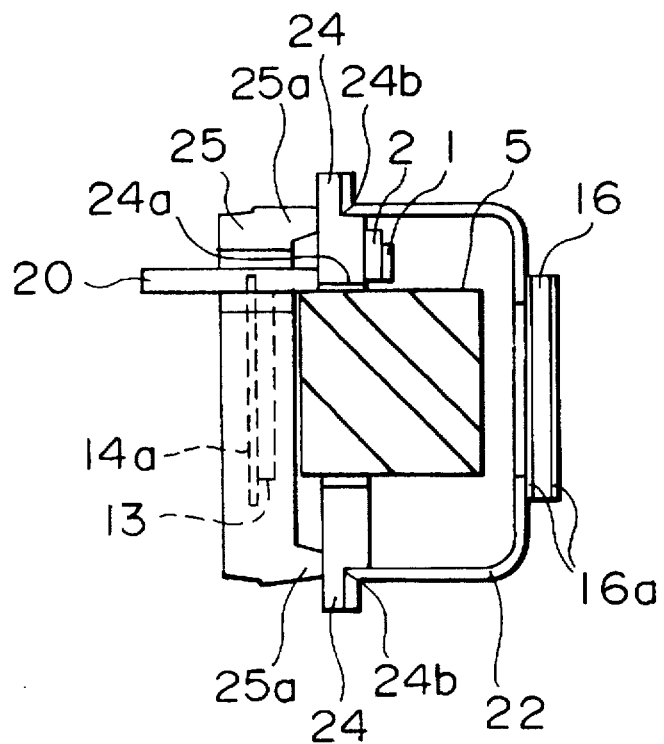
Figure 14:
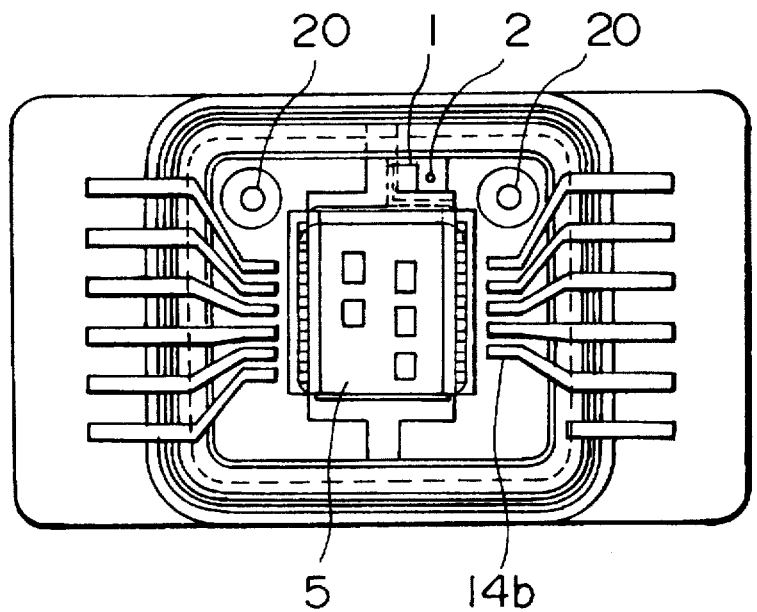
Figure 15:
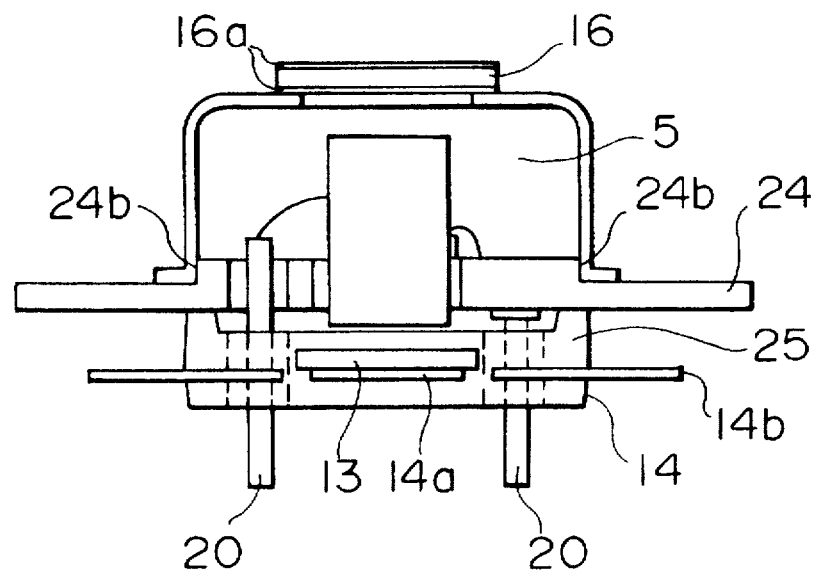
Figure 16:
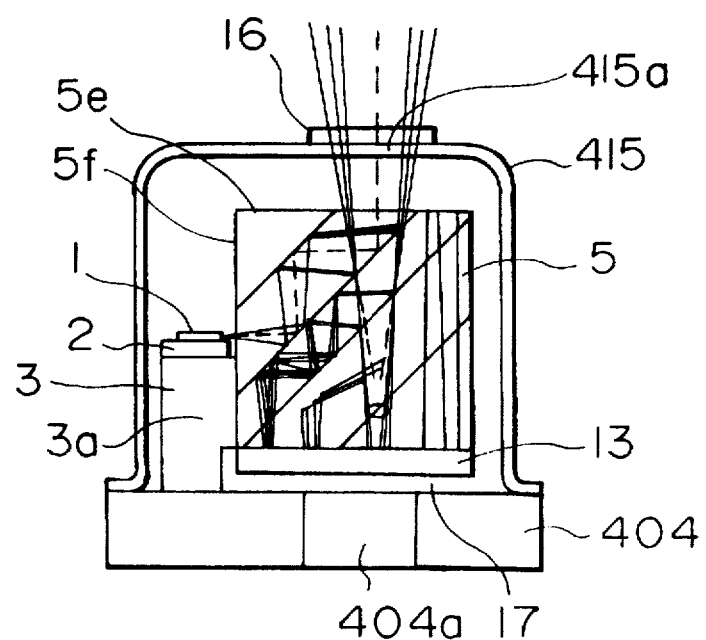
Figure 17:
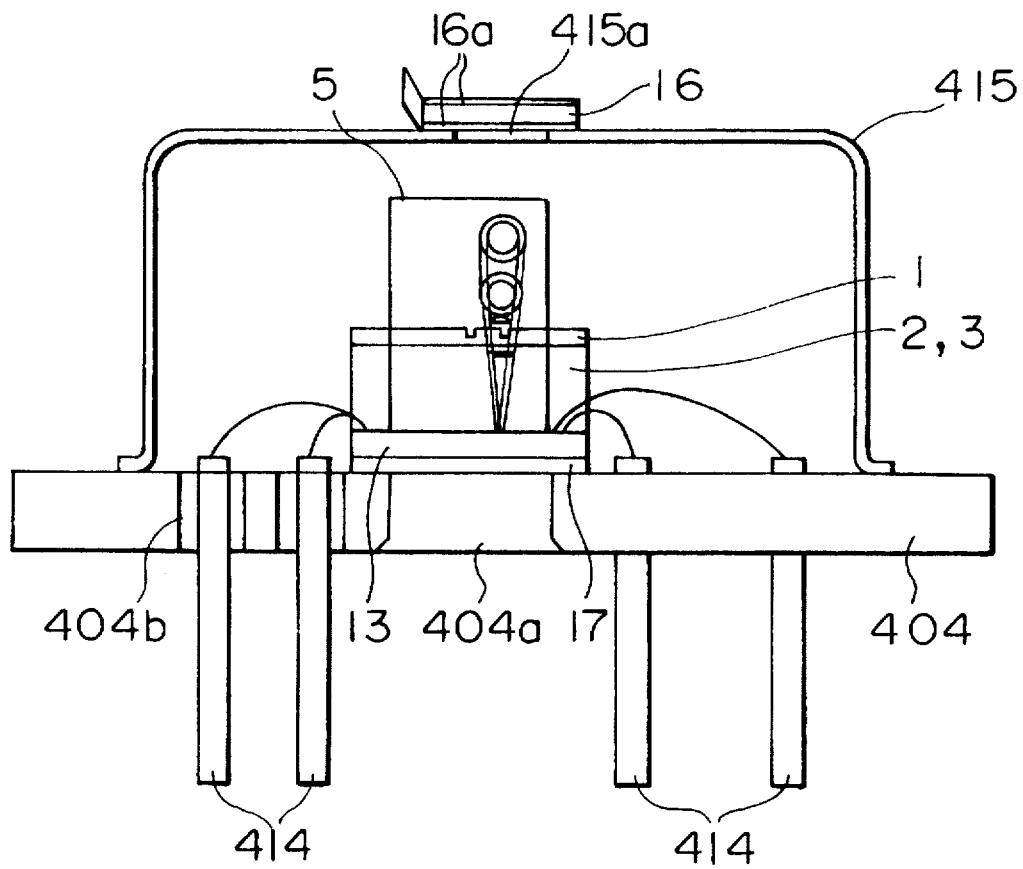
Figure 18:
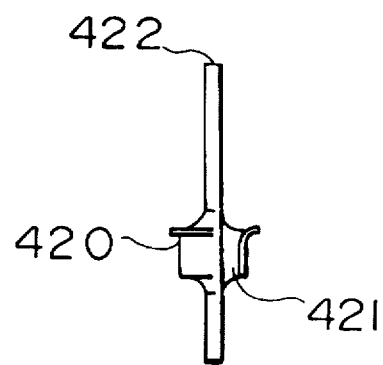
Figure 19:
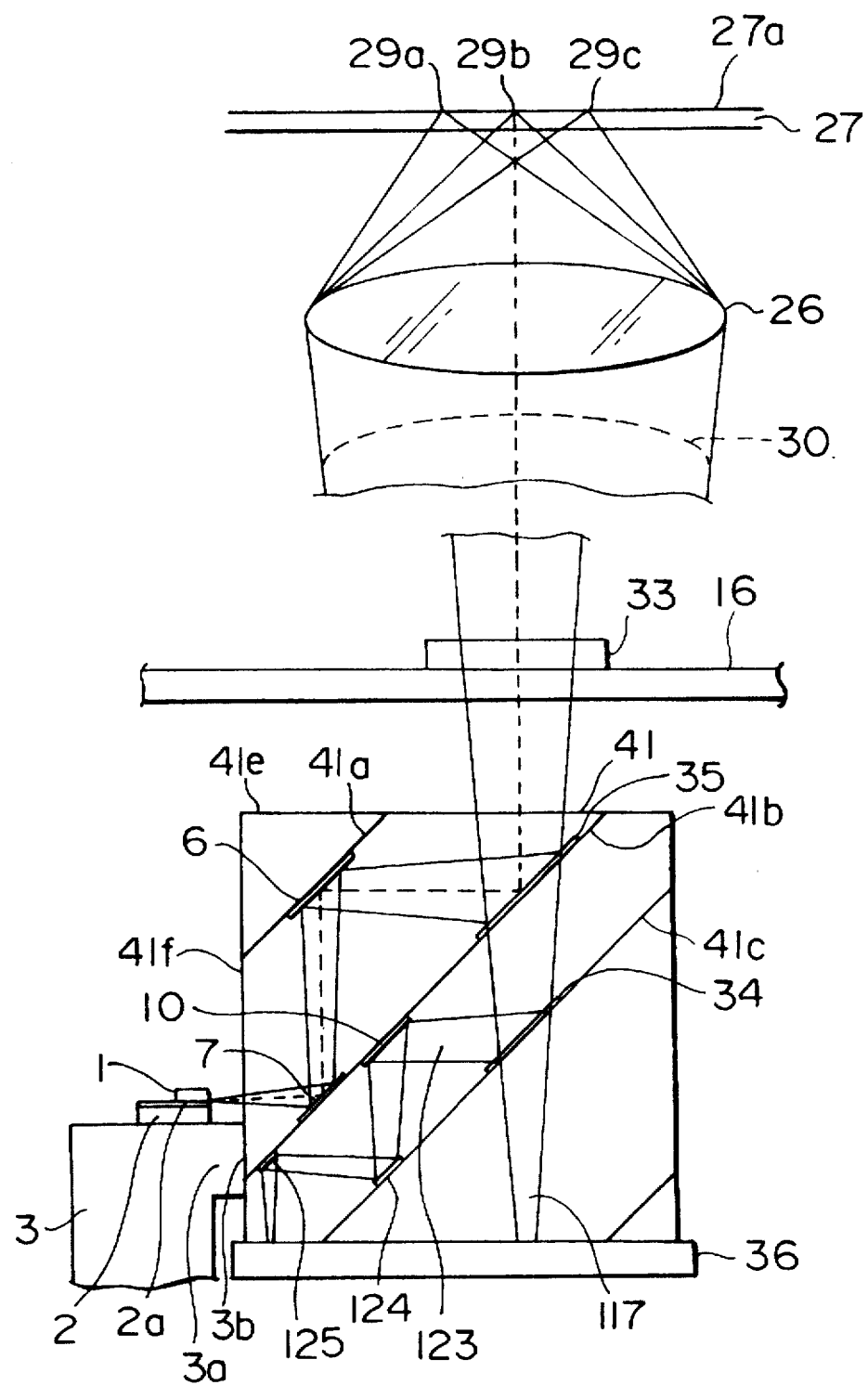
Figure 20:
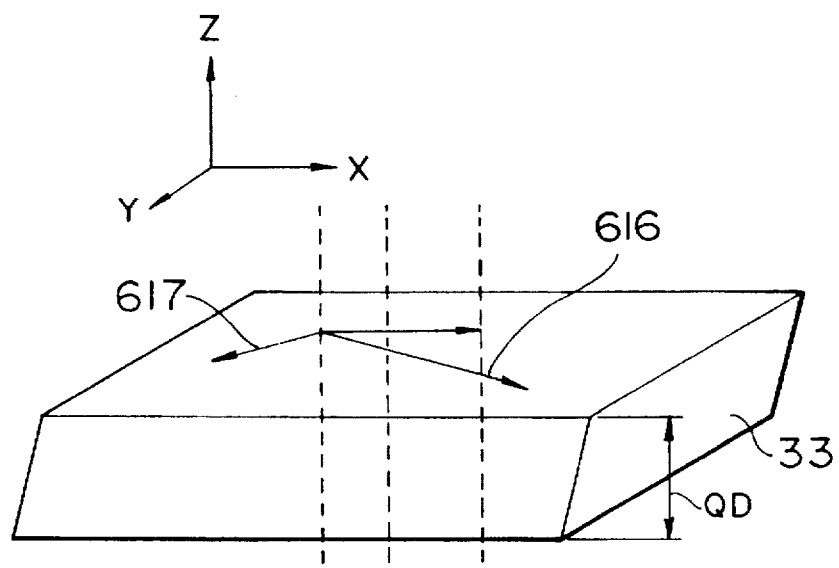
Figure 21:
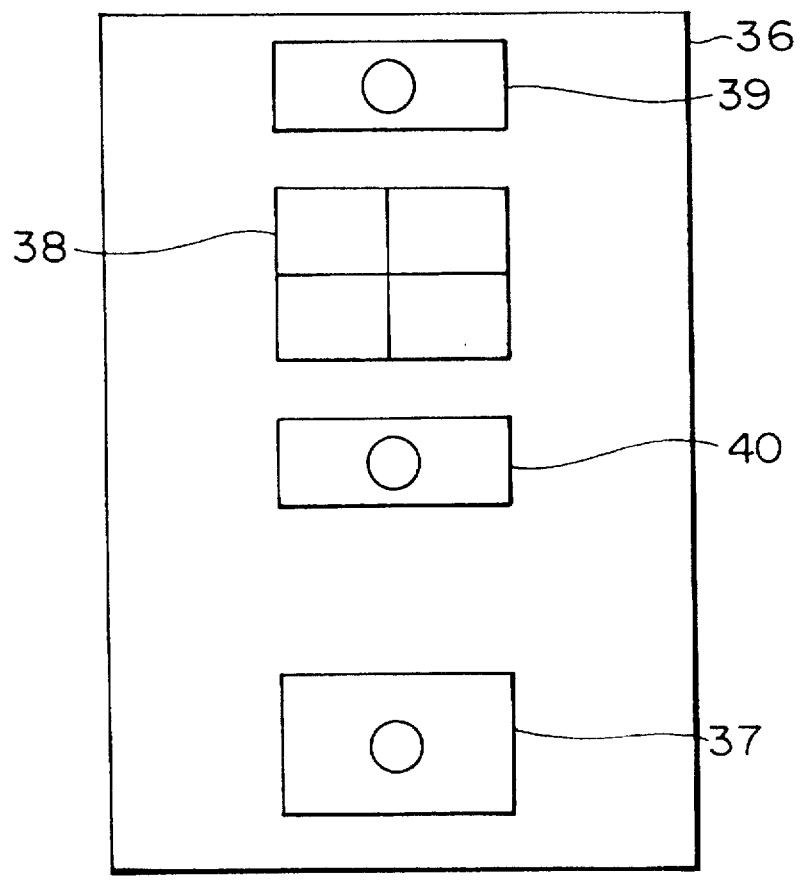
Figure 22:
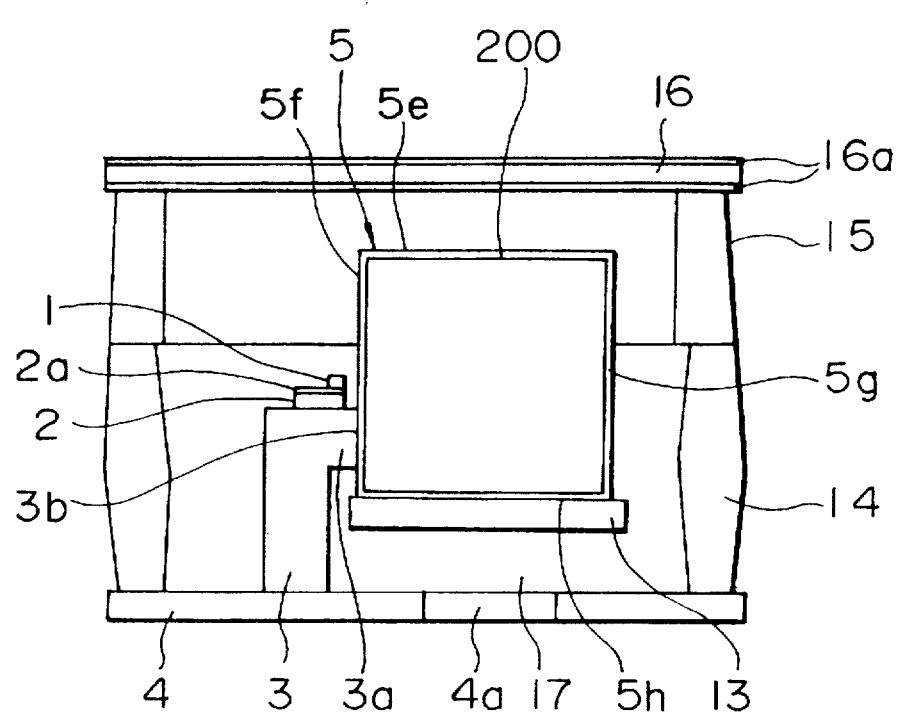
Figure 23:
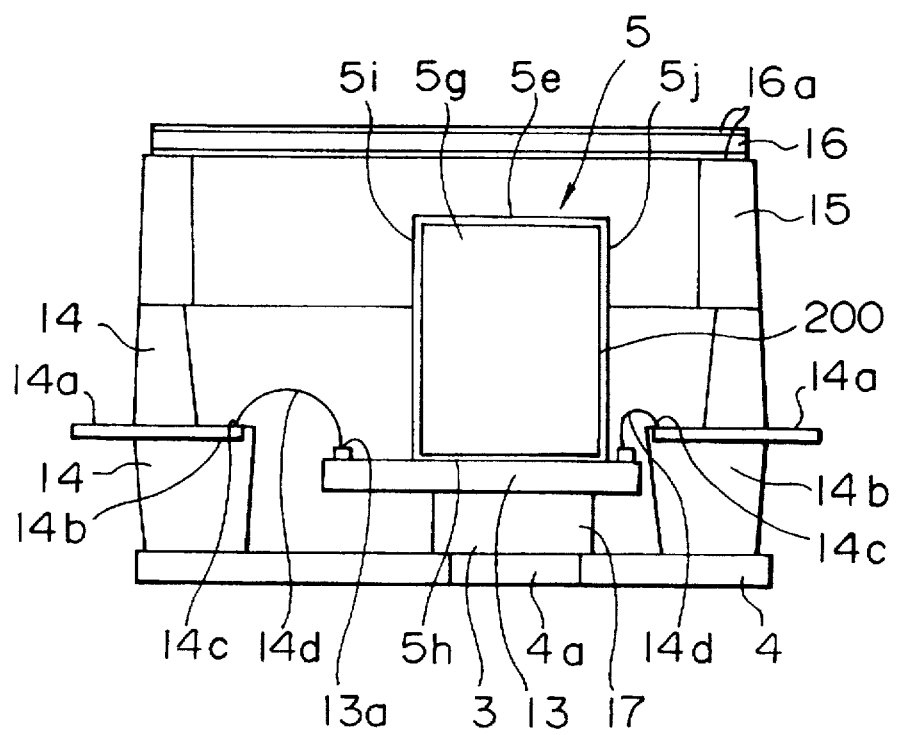
Figure 24:
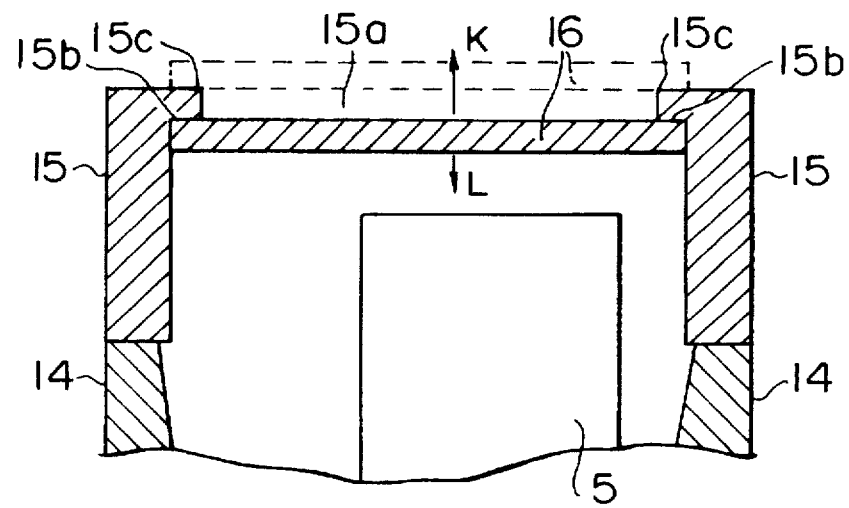
Figure 25:
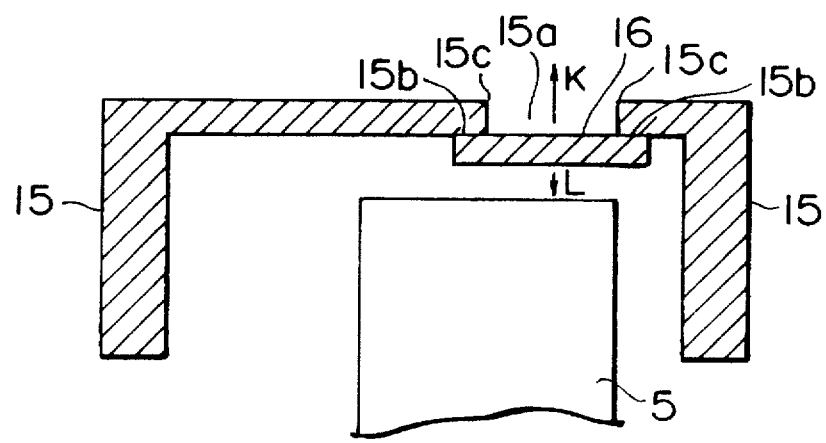
Figure 26:
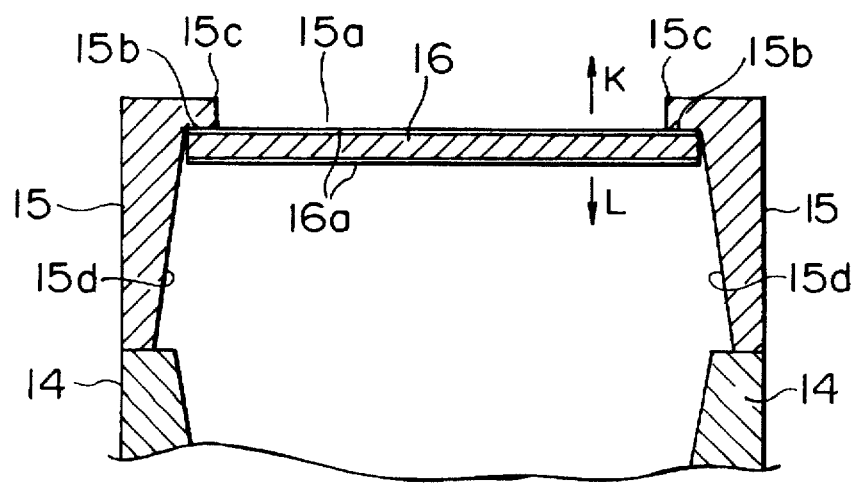
Figure 27:
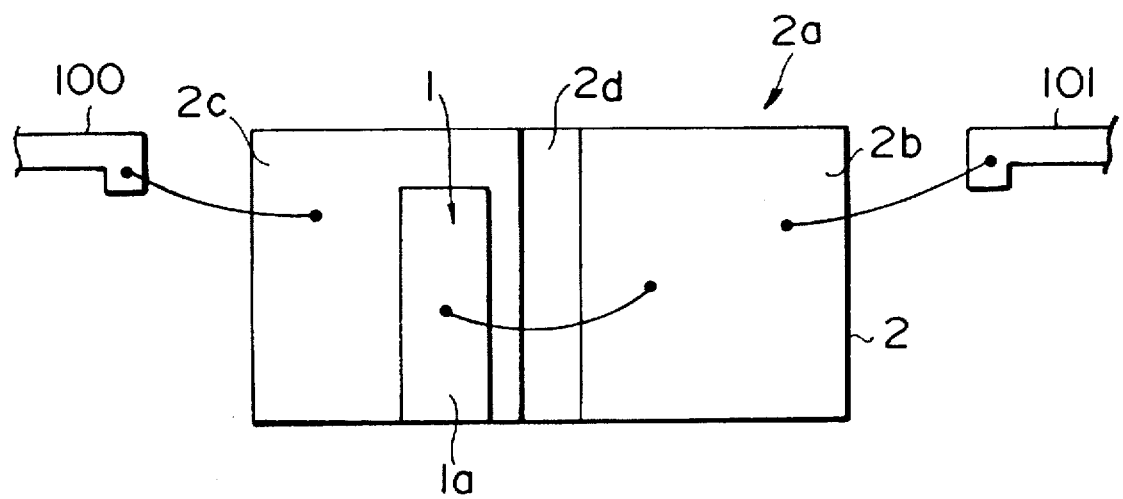
Figure 28:
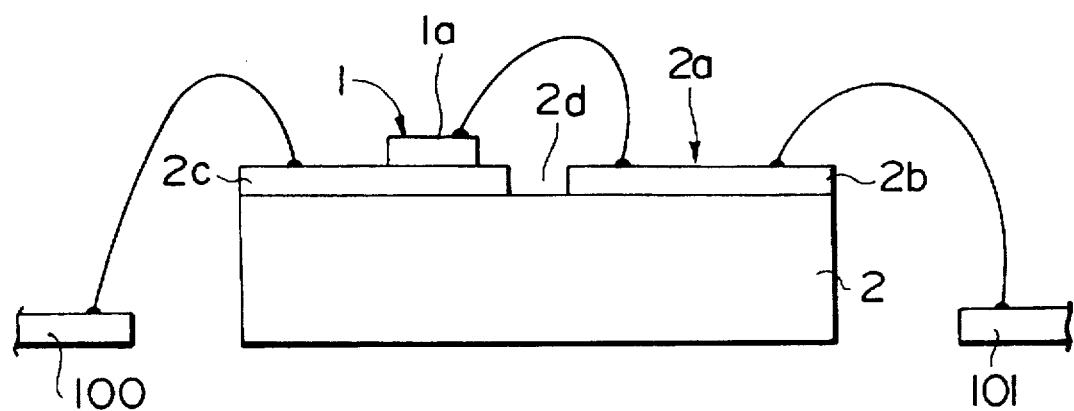

FIG. 6 is a diagram showing the arrangement of light-receiving portions of the optical pickup of FIG. 1, as well as the signal processing;

FIG. 7 is a side-elevational view showing a packaging construction of an optical pickup according to an embodiment of the invention;

FIG. 8 is a plan view of the optical pickup of FIG. 8;

FIG. 9 is a diagram showing the arrangement of light-receiving portions of the optical pickup of FIG. 7, as well as the signal processing;

FIG. 10 is a view showing a packaging construction of an optical pickup according to an embodiment of the invention;

FIG. 11 is a view showing the packaging construction of the optical pickup of FIG. 10;

FIG. 12 is a view showing the packaging construction of the optical pickup of FIG. 10;

FIG. 13 is a view showing a packaging construction of an optical pickup according to an embodiment of the invention;

FIG. 14 is a view showing the packaging construction of the optical pickup of FIG. 13;

FIG. 15 is a view showing the packaging construction of the optical pickup of FIG. 13;

FIG. 16 is a view showing a packaging construction of an optical pickup according to an embodiment of the invention;

FIG. 17 is a view showing the packaging construction of the optical pickup of FIG. 16;

FIG. 18 is a cross-sectional view of a hermetic seal used in the optical pickup of FIG. 16;

FIG. 19 is a schematic view showing the operation of an optical pickup of the invention designed for a phase change-type optical disk;

FIG. 20 is a view showing a $\lambda/4$ plate used in the optical pickup of FIG. 19;

FIG. 21 is a view showing the arrangement of light-receiving portions of a light-receiving element used in the optical pickup of FIG. 19;

FIG. 22 is a cross-sectional view showing the packaging construction of the optical pickup of the invention;

FIG. 23 is a cross-sectional view showing the packaging construction of the optical pickup of the invention;

FIG. 24 is a cross-sectional view showing the manner of mounting a cover member in the invention;

FIG. 25 is a cross-sectional view showing the manner of mounting a cover member in the invention;

FIG. 26 is a cross-sectional view showing the manner of mounting a cover member in the invention;

FIG. 27 is a plan view showing the arrangement of a light source on a sub-mount in the invention; and FIG. 28 is a cross-sectional view showing the arrangement of the light source on the sub-mount in the invention.

DESCRIPTION OF THE PREFERRED EMBODIMENTS

First Embodiment

A packaging construction of an optical pickup according to a preferred embodiment of the present invention will now be described with reference to the drawings.

Figure 2:
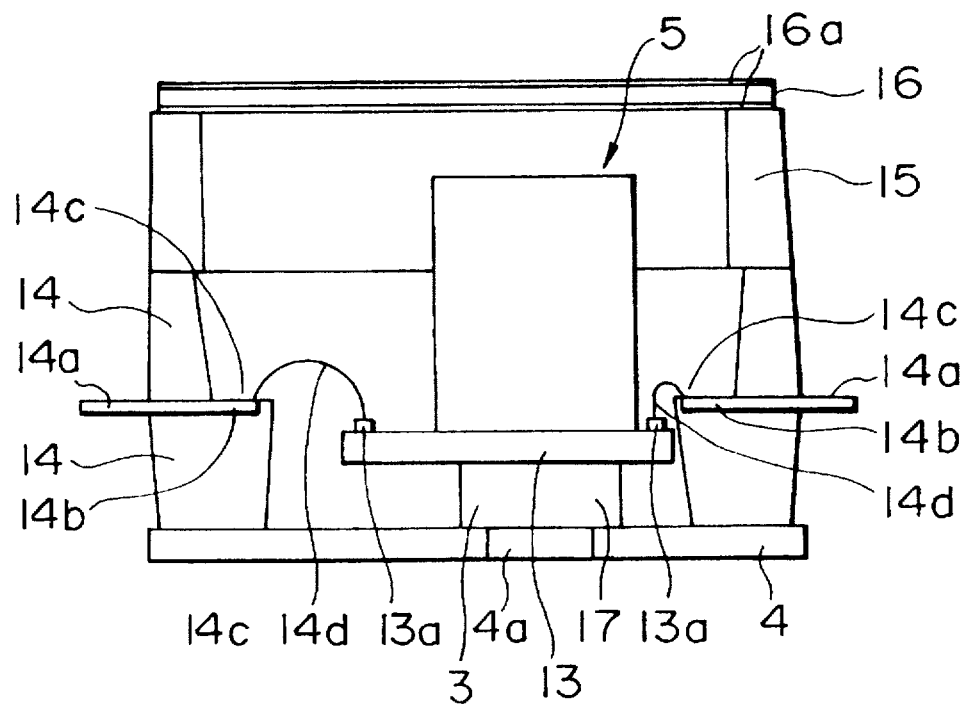
FIG. 2 is a cross-sectional view showing the packaging construction of the optical pickup.

FIGS. 1 and 2 are cross-sectional views showing the packaging construction of the optical pickup according to the preferred embodiment of the invention.

A semiconductor laser, a gas (e.g., He—Ne) laser and any other suitable laser can be used as a light source 1. Here, it is preferred to use a semiconductor laser with an output of several mW to several tens of mW, which is the smallest in size among these, and can reduce the overall size of an optical disk unit, and is inexpensive. For example, AlGaAs, InGaAsP, InGaAlP, ZnSe or GaN can be used as a material for the semiconductor laser. Here, inexpensive, most-commonly used AlGaAs is used. When it is desired to achieve high-density recording, it is preferred to use a semiconductor laser (e.g., InGaAlP, ZnSe or GaN) which emits a laser beam shorter in wavelength than that of an AlGaAs laser, and can form a light spot of a smaller diameter on a recording medium.

A sub-mount 2 has a rectangular parallelepiped shape or a sheet-like shape, and the light source 1 is mounted on an upper surface of the sub-mount 2. The sub-mount 2 thus supports the light source 1, and also allows heat, generated at the light source 1, to escape. In view of thermal conductivity and others, it is preferred that the sub-mount 2 and the light source 1 be bonded together under pressure at a high temperature through a foil (having a thickness of several μm to several tens of μm) of Au—Sn, Sn—Pb, Sn—Pb—In or the like. Unless the light source 1 and the sub-mount 2 are mounted substantially horizontally, this causes aberration of the optical system. Therefore, it is preferred that the light source 1 be mounted at a predetermined position and a predetermined height on the sub-mount 2 when they are bonded together. An electrode surface 2a is formed on the upper surface of the sub-mount 2, and is in electrical contact with a lower surface of the light source 1. This electrode surface 2a serves to supply electric power to the light source 1, and in view of electrical conductivity and corrosion, the electrode surface 2a is preferably formed by a thin film of Au. In view of heat, generated by the light source 1, and the mounting of the light source 1 on the sub-mount 2, the sub-mount 2 is preferably made of a material which has high thermal conductivity, and has a linear expansion coefficient close to that (about $6.5 \times 10^{-6}/°$ C.) of the light source 1. Specifically, it is preferred that a material (e.g., AlN, SiC, T-cBN, Cu/W, Cu/Mo or Si), having a linear expansion coefficient of $3 \sim 10 \times 10^{-6}/°$ C. and thermal conductivity of not less than 100 w/mK, be used. Particularly when the sub-mount 2 is required to have extremely high thermal conductivity as when a high-output laser is used, the sub-mount is preferably made of a material with higher thermal conductivity such as diamond.

When the light source 1 and the sub-mount 2 are equal or close to each other in linear expansion coefficient, the development of a strain between the light source 1 and the sub-mount 2 can be suppressed, and therefore undesirable situations, such as the disengagement of the light source 1 from the sub-mount 2 and the development of cracks in the light source 1, can be prevented. However, if the linear expansion coefficient of the light source 1 and the sub-mount is out of the above range, a large strain develops between the light source 1 and the sub-mount 2, which leads to high possibilities of occurrence of such a problem that the light source 1 is disengaged from the sub-mount 2 and that cracks develop in the light-source 1. When the sub-mount 2 has as high thermal conductivity as possible, the heat, generated by the light source 1, can be allowed to efficiently escape to the exterior. However, if the thermal conductivity of the sub-mount 2 is less than the above-mentioned value, the heat, generated by the light source 1, can not easily escape to the exterior, so that various disadvantages are likely to occur, such as an increased temperature of the light source 1, a decreased output of the light source 1, a shortened lifetime of the light source 1, and in the worst case the light source 1 may be destroyed.

In this embodiment, the sub-mount 2 is made of AlN which is inexpensive, and is excellent both in the above two properties. Further, in order to enhance the bonding of the electrode surface 2a (formed on the upper surface of the sub-mount 2) with the light source 1, it is preferred that thin films, composed respectively of Ti, Pt and Au, be formed on the electrode surface 2a in this order toward the light source 1.

Preferably, the electrode surface 2a of the sub-mount 2 is divided by a groove 2d into at least two electrode surfaces, that is, a first electrode surface 2c and a second electrode surface 2b which are electrically independent of each other, as shown in FIGS. 27 and 28. The light source 1 is mounted on the first electrode surface 2c, and the first electrode surface 2c is connected by wire bonding or the like to a first terminal 100 of a power circuit for supplying electric power to the light source 1. The second electrode surface 2b is connected to a second terminal 101 of the power circuit, and the second electrode surface 2b is connected to an electrode surface 1a of the light source 1. With this construction, since the electrode surface 1a of the light source 1 does not need to be connected directly to the second terminal 101 by wire bonding, the length of the bonding wires is reduced, and a defect due to the cutting of the bonding wire can be suppressed.

Next, a method of examining the light source 1 mounted on the sub-mount 2 of the above construction will be described. A semiconductor laser is used as the light source 1, which has been manufactured at a relatively high defective rate, and therefore each semiconductor laser needs to be examined when assembling the optical pickup. For conducting the examination, detection probes for examination purposes are connected respectively to the first and second electrode surfaces 2c and 2b on the electrode surface 2a formed on the upper surface of the sub-mount 2, and a voltage is applied to the light source 1 to cause the same to emit light, and a wavelength of the light, the angle of divergence of the light, and the current-light intensity characteristics are examined. The wavelength is measured by the use of an optical spectrum analyzer, and the light intensity is measured by a power meter.

When examining the light source 1 on the sub-mount 2 of the above construction, the detection probes are connected respectively to the first and second electrode surfaces 2c and 2b of relatively large areas formed on the upper surface of the sub-mount. Thus, it is not necessary to connect the detection probe to the electrode surface 1a of the light source 1 as in the conventional construction, and therefore the examination is simple, and the light source 1 is hardly damaged during the examination.

A block 3 is of a generally rectangular parallelepiped shape, and has a large projection 3a formed on a side surface thereof, and the sub-mount 2 is mounted on an upper surface of the block 3. In view of the heat, generated by the light source 1, and the mounting of the sub-mount 2 on the block 3, the block 3, like the sub-mount 2, is preferably made of a material which has high thermal conductivity, and has a linear expansion coefficient close to that of the sub-mount 2. More specifically, the block 3 is made, for example, of any of the materials described above for the sub-mount 2, a metal material such as Mo, Cu and Fe, and an alloy such as Fe—Ni—Co alloy and Fe—Ni alloy. Here, the block 3 is made of a material such as Cu and Mo, which is much less expensive than AlN, and is relatively excellent in thermal conductivity, linear expansion coefficient and other characteristics. In view of thermal conductivity and others, it is preferred that the block 3 and the sub-mount 2 be bonded together under pressure at a high temperature through a foil (having a thickness of several μm to several tens of μm) of Au—Sn, Sn—Pb, Sn—Pb—In or the like as described above for the bonding between the sub-mount 2 and the light source 1.

A heat-radiating plate 4 serves to radiate the heat, generated by the light source 1 and transferred through the sub-mount 2 and the block 3 by conduction, to the exterior. Various parts of the optical pickup are mounted on the radiating plate 4, and therefore the radiating plate 4 also serves as part of a packaging member, and thus constitutes a base plate for the packaging structure. Preferably, an opening 4a is formed through the radiating plate 4. This opening 4a serves as a space through which a jig can be inserted for adjusting the position of the members, and the opening 4a also serves as a hole through which gas can be charged in the interior of the package.

The block 3 is fixedly secured to an upper surface of the radiating plate 4 by brazing, soldering or the like.

The radiating plate 4 need to be made of a material with such a high thermal conductivity that the heat, transferred thereto from the block 3, can be efficiently radiated. Examples of such a material include Cu, Al and Fe.

In this embodiment, the sub-mount 2 and the block 3 are separate from each other, but the two may be formed integrally with each other, in which case the integral structure is preferably made of a material with high thermal conductivity such as AlN. With such a construction, the number of the component parts of the optical pickup can be reduced, and besides the heat-radiating effect can be enhanced.

Preferably, a cross-sectional area of the block 3 in a plane parallel to the radiating plate 4 is larger than a cross-sectional area of the sub-mount 2 in a plane parallel to the radiating plate, so that the area of contact of the block 3 with the radiating plate 4 is large. With this construction, the heat, generated by the light source 1, can be radiated more efficiently.

Since high precision is required for the optical axis of the light source 1, the upper surface of the sub-mount 2 is preferably horizontal with a high degree of accuracy. Therefore, the surfaces of the sub-mount 2, the block 3 and the radiating plate 4 are preferably horizontal with a high degree of accuracy.

An optical guide member 5 has a rectangular parallelepiped shape, and has a plurality of inclined surfaces formed therein, an various optical elements are formed on these inclined surfaces. The optical guide member 5 allows the light, emitted from the light source, to go out therefrom, and serves to guide the return light to a predetermined position. For forming the optical guide member 5, the relevant optical elements and position-registration markers are formed by etching or the like on respective predetermined portions of a plurality of plates (substrates) made of optical glass such as BK-7 glass, and then the plurality of plates are bonded together to form an assembly, and then the assembly is cut into a predetermined shape, thereby providing the optical guide member, and at least light incident surfaces of the thus formed optical guide member are polished.

The optical guide member 5 is adhesively bonded at its side surface to the projected surface 3a of the block 3. A bonding material for bonding the block 3 and the optical guide member 5 together must meet various requirements such as a high bonding strength, operability enabling arbitrary instantaneous curing, and a low contraction (shrinkage) coefficient (that is, a small volume change upon curing, and a small volume change due to temperature and moisture). By satisfying these requirements, the operability and the stability of the bonded surface can be enhanced. In this embodiment, a UV (ultraviolet) curing adhesive, which is instantaneously cured upon radiation of ultraviolet rays, is used as the bonding material. Alternatively, a moisture absorption-curing instantaneous adhesive or other light-curing adhesive can be used.

The bonding material is coated in such a manner that the area (S) of the cured bonding material is not less than 1 mm$^2$ (S≧1 mm$^2$), and that the thickness ($t_1$) of the cured bonding material is preferably in the range of 1~100 μm (1≦$t_1$≦100 μm), more preferably even with this range, the thickness $t_2$ of a bonding layer is in the range of 1~ 10 μm (1≦$t_2$≦10 μm), and most preferably even with this range of the thickness $t_2$ the thickness $t_3$ of the cured bonding layer is in the range of 3~7 μm (3≦$t_3$≦7 μm). By thus coating the bonding material, ringing hardly occurs, and the optical guide member 5 and the block 3 can be easily and positively positioned with respect to each other by sliding the optical guide member 5 along the side surface of the block 3, and besides a sufficient strength of bonding between the optical guide member 5 and the block 3 can be achieved.

The thickness of the film of the bonding material is controlled preferably by adjusting the amount of coating of the bonding material, its viscosity, a pressing force and so on.

Preferably, an anti-reflection film 200 is formed on an outer peripheral surface of the optical guide member 5. With such a construction, reflected light and stray light can be reduced, and the optical pickup, which produces less noises, can be provided efficiently.

For example, when the anti-reflection film 200 is formed on that surface 5f of the optical guide member 5 facing the light source 1 as shown in FIGS. 22 and 23, light reflected by the surface 5f is prevented from entering the light source 1, and therefore noises due to the return light will not develop in the light emitted from the light source 1. Besides, the light, emitted from the light source 1, can be efficiently guided into the optical guide member 5.

Further, when the anti-reflection film 200 is formed on that surface 5e of the optical guide member 5 through which the light goes out and enters, the light can efficiently go out of the optical guide member 5 toward the optical medium, and besides the light, reflected by the optical medium, can efficiently enter the optical guide member 5.

By thus providing the anti-reflection film 200 on at least one of the surfaces 5f and 5e, the light can be efficiently guided to the relevant portion, and therefore the light source 1 does not need to be of the type which produces a high output power, and therefore the amount of radiation of the heat from the light source 1 is reduced, so that the generation of thermal noises due to the heat, a variation in wavelength of LD, the destroy of the light source 1, and so on can be suppressed. Most preferably, the anti-reflection films 200 are formed respectively on the surfaces 5f and 5e so that the light can efficiently travel along the various paths.

In this embodiment, the anti-reflection film 200 is formed on that surface 5g of the optical guide member 5 which faces away from the surface 5f, and with this construction unnecessary light (which is the cause of stray light) in the optical guide member 5 can be efficiently sent out to the exterior, and therefore the amount of the light, reaching a light-receiving element 13, can be reduced, so that the inclusion of noises in a reproduction signal can be suppressed.

Further, the anti-reflection film 200 is formed on that surface 5h of the optical guide member 5 which faces the light-receiving element 13, and therefore the light, reflected by the optical medium, can be efficiently guided to the light-receiving element 13 through the optical guide member 5.

Such an anti-reflection film may also be formed on other surfaces 5i and 5j of the optical guide member 5.

Metal oxide and other material are used for forming the anti-reflection film 200, and in this embodiment the anti-reflection film comprises a plurality of films laminated together.

For example, the anti-reflection film 200 comprises a first film formed on the optical guide member 5, and a second film of $MgF_2$ formed on this first film, the first film being formed of at least one material selected from the group consisting of $TiO_2$, $Al_2O_3$, $Ta_2O_5$ and $ZrO_2$.

In this embodiment, the anti-reflection film 200 has a two-layer structure composed of $Al_2O_3$ and $MgF_2$, and the optical film thickness of $Al_2O_3$ and $MgF_2$ are determined by the following formula:

$$n \times d = \lambda \times (2m-1) \div (4 \times \cos \theta)$$

n: refractive index of each thin film
d: thickness of each thin film
λ: wavelength of the light source
θ: refractive angle to each thin film
m: natural number Here, the values of "n" and λ can be determined when the material of the anti-reflection film 200 and the light source are determined, and the value of θ can be easily determined. Therefore, the optimum film thickness of the anti-reflection film 200 can be determined.

In this embodiment, since the light perpendicular to the surfaces 5e, 5f, 5g, 5h, 5i and 5j is handled, θ is 90 degrees, and the above formula is approximately expressed by the following formula:

$$n \times d = \lambda \times (2m-1) \div 4$$

Therefore, when the refractive index of the anti-reflection film and the wavelength of the light source are determined, the optimum film thickness can be determined.

The light-receiving element 13 comprises a plate-like semiconductor wafer having various electric circuits formed thereon, and the light-receiving element 13 is mounted on a bottom or lower surface of the optical guide member 5. A bonding material for bonding the light-receiving element 13 and the optical guide member 5 together must meet various requirements such as a high bonding strength, operability enabling arbitrary instantaneous curing, and a low contraction. (shrinkage) coefficient (that is, a small volume change upon curing, and a small volume change due to temperature and moisture). By satisfying these requirements, the operability and the stability of the bonded surface can be enhanced. A UV (ultraviolet) curing adhesive, which particularly enables the good operativity since it is instantaneously cured upon radiation of ultraviolet rays, is used as the bonding material. Alternatively, a moisture absorption-curing instantaneous adhesive can be used. Preferably, the optical guide member 5 and the block 3 are bonded together by a visible light-curing adhesive whereas the optical guide member 5 and the light-receiving element 13 are bonded together by a UV-curing adhesive. In this case, the visible light-curing adhesive is coated on a bonding surface between the block 3 and the optical guide member 5, and the UV-curing adhesive is coated on a bonding surface between the light-receiving element 13 and the optical guide member 5, and then visible light is first applied to bond the optical guide member 5 and the block 3 together, and subsequently ultraviolet rays are applied to bond the optical guide member 5 and the light-receiving element 13 together.

By using the plurality of bonding materials having different curing conditions, the assembling efficiency and the mounting strength are compatible with each other, and therefore the time required for the manufacture of the optical pickup can be greatly reduced without reducing the strength of the product.

The light-receiving element 13 has a plurality of light-receiving portions for receiving light signals composed of the light which is emitted from the light source 1, and is reflected by the optical guide member 5 and the recording medium. The optical signal, detected by each of these light-receiving portions, is converted into an electrical signal corresponding to its light amount. Upon conversion, this electrical signal has first a value corresponding to its current value, and this current is very weak, and is disadvantageous in that it is likely to pick up noises. Therefore, the light-receiving element 13 is preferably of the type containing a I-V amplifier which converts the current value into a corresponding voltage value, and amplifies it. A plurality of electrodes 13a each formed by a thin film of Al or the like are formed on the surface of the light-receiving element 13 so as to provide the received light (representative of the information) as a signal.

In this embodiment, although the light-receiving element 13 is bonded to the bottom surface of the optical guide member 5, this element 13 may be mounted on the upper surface of the radiating plate 4 if this can be achieved with high precision.

A package 14 serves as part of the packaging member, and is mounted on the upper surface of the radiating plate 4 in surrounding relation to the block 3, the optical guide member 5 and the light-receiving element. A lead frame 14a, used for receiving the electric signals from the light-receiving element 13 and for supplying electric power to the light source 1, is molded in the package 14. A stepped portion 14c is formed on the inner surface of the package 14 at which the lead frame 14a is molded, and legs 14b of the lead frame 14 are exposed at this stepped portion 14. The package 14 may have a cylindrical shape. Those legs 14b of the lead frame 14a (which are exposed at the stepped portion 14c of the package 14) for receiving the electric signals from the light-receiving element 13 are connected (or wire-bonded) to the plurality of electrodes 13a, formed on the upper surface of the light-receiving element 13, by wires 14d made of Au, Al or the like. Those legs 14b of the lead frame 14a (which are exposed at the stepped portion 14c of the package 14) for supplying the electric power to the light source 1 are connected (or wire-bonded) to the upper surface of the light source 1 by wires 14d. Other legs 14b of the lead frame 14a (which are exposed at the stepped portion 14c of the package 14) are connected (or wire-bonded) by wires 14d to the electrode surface 2a formed on the upper surface of the sub-mount 2 for electrical contact with the lower surface of the light source 1.

A material of which the package 14 is made is required to have a low water absorption property and a low outgassing property, and in this embodiment a thermosetting resin, such as an epoxy resin most commonly used in IC molding, is used. The lead frame 14a is usually made of metal of Cu, 42 alloy, Fe or the like plated with Ag, Au or the like. In this embodiment, the lead frame 14a is made of Cu which is plated with Ni, and is further plated with Au. The package 14 and the radiating plate 4 are bonded together by a bonding material which can provide a high bonding strength, and has a low water absorption property and a high hermetic property (that is, a low leakage property). With the use of such a bonding material, the stability of the bonding surface and the bonding position can be enhanced, and impurities are prevented from being introduced into the interior of the packaging of the optical pickup. In this embodiment, an epoxy adhesive, which is excellent in these properties, and is inexpensive, is used.

The radiating plate 4 and the package 14 may be formed integrally with each other.

A shell 15 is also part of the packaging member, and has a hollow, parallelepiped shape like the package 14. A horizontal cross-sectional shape of the shell 15 is generally the same as that of the package 14. A material of which the shell 15 is made is required to have a low water absorption property and a low outgassing property so as to prevent impurities from being introduced into the interior of the packaging structure. In this embodiment, the shell 15 is made of polybutylenetetrephthalate (hereinafter referred to as "PBT"). Particularly when excellent strength and dimensional accuracies are required, LCP, which is more expensive than PBT but excellent in these properties, may be used. For the same reasons described above for the bonding between the package 14 and the radiating plate 4, an epoxy adhesive is used for bonding the shell 15 and the package 14 together.

Instead of using the shell 15, the height of the side or peripheral wall of the package 14 may be increased to a level higher than that of the optical guide member 5.

A cover member 16 prevents dirt, dust and the like from depositing on the optical guide member 5, the light-receiving element 13 and others, and this cover member 16 is fixedly secured to an upper surface of the shell 15 by an epoxy adhesive. Preferably, the cover member 16 is made of glass, such as BK-7, FK-1 and K-3, or a resin of high light transmittance such as urethane, polycarbonate and an acrylic resin. Preferably, an anti-reflection film 16a for preventing reflection is formed on each of upper and lower surfaces of the cover member 16. Preferably, the anti-reflection film 16a formed using $MgF_2$ and other material as described above for the anti-reflection film 200 shown in FIG. 22.

With respect to the positional relation between the cover member 16 and the optical guide member 5, in one case, the two are in contact with each other, and in other case the two are spaced from each other. In the case where the two are in contact with each other, the optical guide member 5 is fixedly secured to the lower surface of the cover member 16 by an epoxy adhesive or a UV-curing adhesive. In this case, the thickness (t1) of the cover member 16 is in the range of between 0.3 mm and 3.0 mm ($0.3 \leq t1 \leq 3.0$ (mm)). If the thickness is less than this lower limit, there is a possibility that the cover member 16 can not withstand the weight of the optical guide member 5 and tension developing when the adhesive is cured, and is damaged or broken. With respect to the upper limit, since the cover member 16 is larger in refractive index than the air, it converges light rather than diverges it, and therefore the distance between the cover member 16 and either a collimator lens (in the case of an infinite optical system) or an objective lens (in the case of a finite optical system) must be made long, and this is disadvantageous in achieving a small-size design of the pickup unit. With the above construction, the height of the optical pickup can be reduced, and the pickup unit can be formed into a small size while maintaining a sufficient mounting strength.

On the other hand, in the case where the cover member 16 is spaced from the optical guide member 5, it is preferred that the thickness (t2) of the cover member 16 be in the range of between 0.1 mm and 3.0 mm ($0.1 \leq t2 \leq 3.0$ (mm)) and that the distance (d) between the cover member 16 and the optical guide member 5 be in the range of between 0.1 mm and 3.0 mm ($0.1 \leq d \leq 3.0$ (mm)). With respect to the lower limit of the thickness t2, the optical guide member 5 is not mounted on the cover member 16 in contrast with the above case, and the cover member 16 need only to withstand external factors such as vibrations. The smaller the distance d, the better. However, it is possible that the assembling tolerance can not be reduced to less than 0.1 mm, and in such a case there is a possibility of occurrence of such that the cover member 16 contacts the optical guide member during the assembling operation, and is damaged. With the above construction, the precision of the relative mounting position between the optical guide member 5 and each of the light source 1, the sub-mount 2 and the block 3 can be enhanced, and also the block 3 or the sub-mount 2 can be held in thermal contact with other member. With such an arrangement, the heat, generated by the light source 1, can be easily radiated to the exterior.

When the cover member 16 is to be mounted on the shell 15, dry gas, hardly containing oxygen and moisture (ideally, containing no oxygen and no moisture) is preferably charged in the interior of the packaging structure of the optical pickup in order to prevent oxidation of the light source 1 and the light-receiving element 13 and also to prevent condensation on the glass portions. One requirement for this dry gas is that this gas should have a dew point (at which water vapor contained in the gas is saturated) of not more than $-10°$ C., preferably $-20°$ C. and more preferably $-30°$ C. in order to effectively prevent condensation within the package of the optical pickup. Particularly when the dry gas has a dew point of not more than $-30°$ C., the quality of the product can be guaranteed outdoors even in those districts subjected to severe climates. Examples of such dry gas to be filled in the package include $N_2$ gas, dry air (both of which are advantageous from the view point of the cost), and chemically-inert gas (which hardly causes a chemical reaction within the package) such as Ar, Ne and He. The pressure (P) of the dry gas charged in the package is preferably in the range of between 0.5 atm and 1.5 atm ($0.5 \leq P \leq 1.5$ (atm)) and more preferably in the range of not less than 1 atm and 1.5 atm ($1 \leq P \leq 1.5$ (atm)). With such pressure, the decrease of the light amount and the development of aberration can be prevented without being subjected to adverse effects of the atmospheric pressure difference between the inside and outside of the package. When the dry gas is charged in the package at a pressure of not less than 0.5 atm, the optical characteristics of the optical pickup will hardly be affected or degraded even if the interior of the package is not kept completely hermetic, and hence has a certain leakage rate. When the dry gas is charged in the package at a pressure of not more than 1.5 atm, stresses due to the difference between the inside pressure and the outside or ambient pressure will not act on the joint portions of the package to such a degree as to damage these joint portions, and therefore even if vibration or an impact of a certain level is applied to the package, the package will not be damaged. Further, when the pressure of the dry gas is higher than 1 atm, the outside air will not flow into the package even if the package has a certain leakage rate.

If the difference between the pressure within the package and the atmospheric pressure is negative, the leakage rate of the package is preferably not more than $1 \times 10^{-8}$ (atm·cc/sec).

If the difference between the pressure within the package and the atmospheric pressure is positive, the leakage rate of the package is preferably not less than $1\times10^{-3}$ (atm·cc/sec). With such arrangement, condensation, caused in the optical pickup by a very small amount of the air intruding into the package, can be suppressed over a prolonged period of time, and therefore the reliability of the optical pickup can be maintained for a long period of time.

By the use of the above construction, the deposition of dirt on the light source 1, the optical guide member 5 and so on, the development of condensation on the optical guide member 5, the inner surface of the cover member 16 and so on can be prevented, and therefore the decrease of the light amount and the development of aberration can be prevented. And besides, even if vibration or an impact of a certain level is applied to the package, the package will not be damaged by stresses due to the atmospheric pressure difference between the inside and outside of the package, and the ambient moisture will not hardly be drawn into the package by the atmospheric pressure difference. Therefore, there can be provided the highly-reliable optical pickup. The heat, generated by the light source 1, can be easily radiated to the exterior, and by providing two openings respectively in the opposite end surfaces of the package, the anti-oxidant gas can be easily charged in the package. With respect to the optical system, the light source 1, the optical guide member 5 and the light-receiving element 3 can be firmly kept properly positioned with respect to one another, and therefore any malfunction and any extra optical aberration due to displacement of these parts will not occur.

Next, the position of mounting of the cover member 16 on the shell 15 will be described with reference to the drawings.

As shown in FIG. 24, the position of mounting of the cover member 16 on the shell 15 is preferably varied depending on whether the pressure of the inert gas or the like charged in the interior of the optical pickup is higher or lower than the atmospheric pressure (1 atm). More specifically, if the pressure within the optical pickup is higher than the atmospheric pressure, it is preferred that the cover member 16 be intimately bonded to an inner surface 15b of the shell 15, with almost no gap formed therebetween. The reason is that if the pressure within the optical pickup is positive, the pressure acts on the cover member 16 to urge the same outwardly in a direction K (FIG. 24), so that the cover member 16 is pressed against the shell 15. Therefore, the intimate contact between the shell 15 and the cover member 16 is enhanced, and there is a remote possibility of leakage through this bonded portion. If the cover member 16 is bonded to an outer surface 15c of the shell 15, the cover member 16 is urged in a direction away from the shell 15 since the pressure acts on the cover member 16 to urge the same outwardly in the direction K. Therefore, the intimate contact between the shell 15 and the cover member 16 is adversely affected, and the bonded portion between the cover member 16 and the shell 15 fails to withstand this pressure or force, thus causing fine leakage, and in the worst case the bonded portions of the cover member 16 and the shell 15 are disengaged from each other, and therefore the cover member 16 is displaced or disengaged, so that the light, passing through the cover member 16, is subjected to aberration. Also, moisture or other impurities intrude into the interior of the optical pickup, thereby degrading the performance of the light source 1. And besides, condensation develop in the optical pickup. These disadvantages contribute to the lowered performance of the optical pickup.

If the pressure within the optical pickup is lower than the atmospheric pressure, it is preferred that the cover member 16 be intimately bonded to the outer surface 15c of the shell 15, with almost no gap formed therebetween. The reason is that if the pressure within the optical pickup is negative, the pressure acts on the cover member 16 to urge the same inwardly in a direction L (FIG. 24), so that the cover member 16 is pressed against the shell 15. Therefore, the intimate contact between the shell 15 and the cover member 16 is enhanced, and there is a remote possibility of leakage through this bonded portion. If the cover member 16 is bonded to the inner surface 15b of the shell 15, the cover member 16 is urged in a direction away from the inner surface 15b of the shell 15 since the pressure acts on the cover member 16 to urge the same inwardly in the direction L. Therefore, the intimate contact between the shell 15 and the cover member 16 is adversely affected, and the bonded portion between the cover member 16 and the shell 15 fails to withstand this pressure or force, thus causing fine leakage, and in the worst case the bonded portions of the cover member 16 and the shell 15 are disengaged from each other, and therefore the cover member 16 is displaced or disengaged, so that the light, passing through the cover member 16, is subjected to aberration. Also, moisture or other impurities intrude into the interior of the optical pickup, thereby degrading the performance of the light source 1. And besides, condensation develop in the optical pickup. These disadvantages contribute to the lowered performance of the optical pickup.

As described above, if the pressure within the optical pickup is higher than the atmospheric pressure, the cover member 16 is intimately bonded to the inner surface 15b of the shell 15 with almost no gap formed therebetween, and if the pressure within the optical pickup is lower than the atmospheric pressure, the cover member 16 is intimately bonded to the outer surface 15c of the shell with almost no gap formed therebetween. With such arrangement, the cover member 16 is always pressed against the shell 15, and therefore the intimate contact between the shell 15 and the cover member 16 is further enhanced. Therefore, the charged inert gas or the like will hardly leak, so that the interior of the optical pickup can be made highly hermetic. And besides, the intrusion of the ambient air into the interior of the optical pickup due to the imperfect bonding hardly occurs, and therefore the deterioration of the light source and condensation due to the intruded ambient air can be prevented, so that the reliability of the optical pickup can be made very high.

In a modified form of the invention, a cover member 16 is provided only at that region where the light goes into and out of the optical pickup, as shown in FIG. 25. In this case, the cover member 16 has a reduced area, and therefore the entry of extra light into the optical pickup from the exterior can be suppressed, thereby suppressing the generation of noises due to external factors in the optical pickup, so that the performance of the optical pickup can be enhanced. Preferably, a stepped portion is formed in either an inner surface 15b or an outer surface 15c of the cover member 16 around an opening 15a, and the cover member 16 is fitted in this stepped portion. With this construction, the positioning of the cover member 16 can be easily effected.

In a modified form of the invention, an inner side surface 15d of the shell 15 is tapered as shown in FIG. 26, and with this arrangement the cover member 16 can be easily mounted in position on the shell 15.

The operation of the optical pickup of this embodiment will now be described with reference to the drawings.

Figure 3:
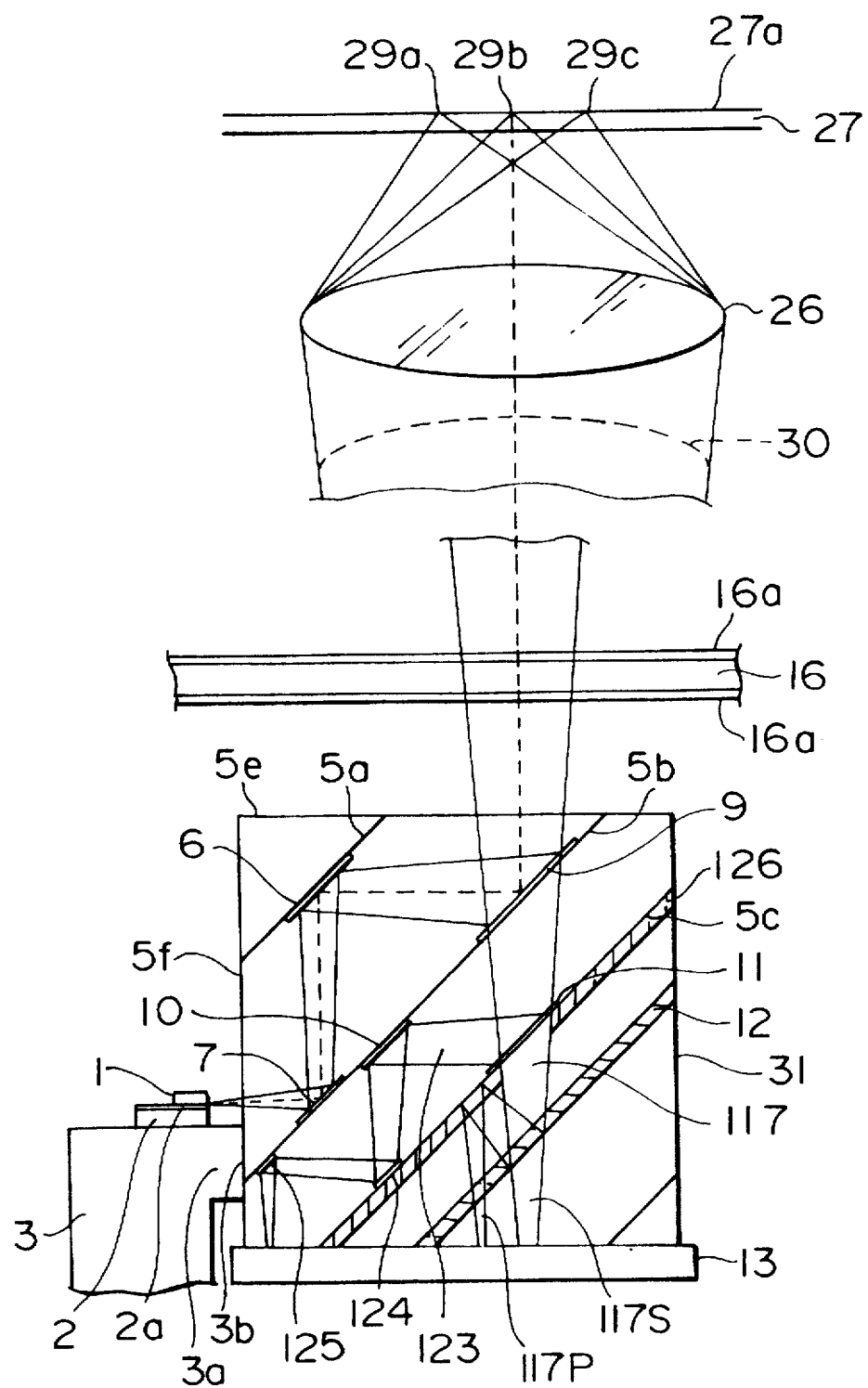
FIG. 3 is a schematic view showing the operation of the optical pickup of FIG. 1.
Figure 4:
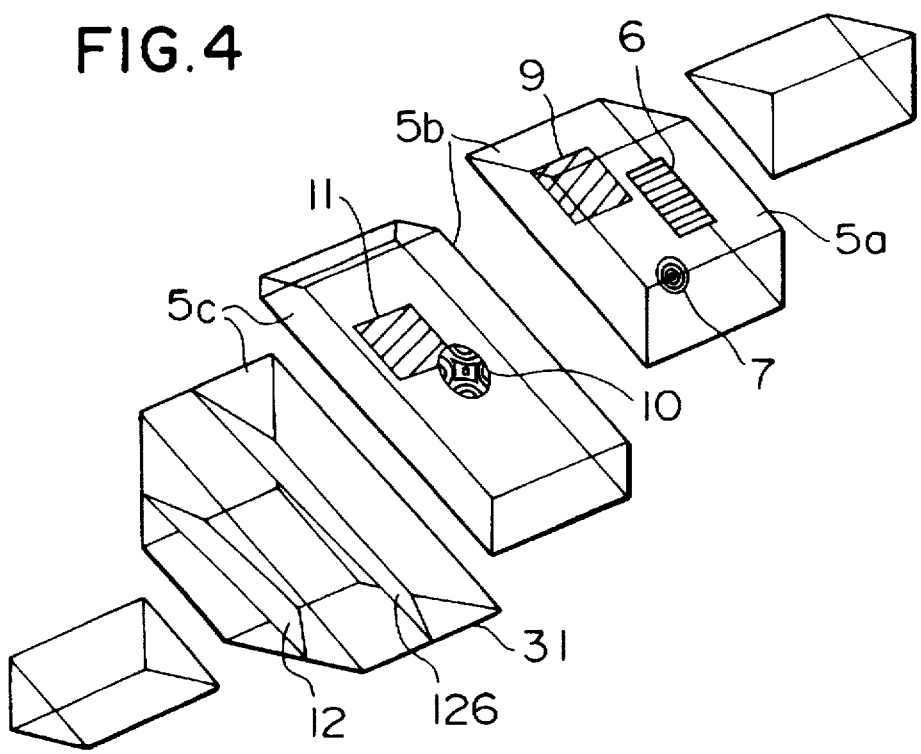
FIG. 4 is an exploded, perspective view showing an optical guide member of the optical pickup of FIG. 1.

Light (laser beam), emitted horizontally from the light source 1 mounted horizontally on the radiating plate 4 through the sub-mount 2 and the block 3, is incident on the surface 5f of the optical guide member 5 having the plurality of inclined surfaces, and enters the optical guide member 5, and reaches a diffusion angle conversion hologram 7 of the reflective type formed on the second inclined surface 5b of the optical guide member 5. This diffusion angle conversion hologram 7 has the function of converting a diffusion angle of the outgoing light with respect to a diffusion angle of the incident light (hereinafter referred to as "conversion of NA"). The light can be converted by the diffusion angle conversion hologram 7 into parallel rays of light having no diffusion angle at all. The diffusion angle conversion hologram has such a function that the light beam, going out of the optical guide member 5, can compensate the light beam for wave aberrations accumulated on the path so that the light beam has an ideal spherical wave 30 as shown in FIG. 3. Therefore, the light beam incident on an objective lens 26 has the ideal spherical wave 30, and an image spot, converged on the recording medium 27 by the objective lens 26, can substantially have a diffraction limit size, that is, an ideal size, so that the information can be easily recorded and reproduced.

The light beam, subjected to the conversion of NA and reflected by the diffusion angle conversion hologram 7, is split into zero-order diffraction component (hereinafter referred to as "main beam") and ±1 order diffraction component (hereinafter referred to as "side beam") by a diffraction grating 6 of the reflective type formed on a first inclined surface 5a. The main beam and the side beams, formed by the diffraction grating 6, are incident on a first beam splitter film 9 having polarization selectivity (hereinafter referred to as "first beam splitter film"). The first beam splitter film 9 has substantially 100% transmittance for light having a vibration component parallel to the plane of incidence (hereinafter referred to merely as "P polarization component"), and also has a predetermined reflectance for light having a vibration component perpendicular to the plane of incidence (hereinafter referred to merely as "S polarization component").

Reference is now made to the positions of the diffraction grating 6, the diffusion angle conversion hologram 7 and the first beam splitter film 9 provided in the outgoing light path. The diffraction grating 6 is formed on that surface of the plate (substrate) (which is interposed between the first inclined surface 5a and the second inclined surface 5b) facing the recording medium, and the diffusion angle conversion hologram 7 and the first beam splitter film 9 are formed on that surface of the plate (which is interposed between the first inclined surface 5a and the second inclined surface 5b) facing away from the surface thereof having the diffraction grating 6 formed thereon. Therefore, the light from the light source 1 is reflected only in the plate interposed between the first and second inclined surfaces 5a and 5b, and goes out of the optical guide member 5, and therefore the optical path can be so determined that the light will not transmit through the resin layer bonding the plate, interposed between the first and second inclined surfaces 5a and 5b, to the adjoining plate. Therefore, wave aberration, generated when the light transmits through the resin layer, is prevented, and the spot, converged on the disk, can substantially have a diffraction limit size. Preferably, the outer peripheral surface of the plate, interposed between the first and second inclined surfaces 5a and 5b, is polished to a satisfactory level. By doing so, the generation of wave aberration at each transmission surface and reflection surface can be further suppressed. And besides, since the diffraction grating 6, the diffusion angle conversion hologram 7 and the first beam splitter film 9 are formed on one or common plate, the plurality of plates do not need to be positioned with respect to one another in contrast with the conventional construction when effecting the precision control during the working of the plates, and it is only necessary to control the positioning of the diffraction grating 6, the diffusion angle conversion hologram 7 and the first beam splitter film 9 (which are formed on the common plate) with respect to one another. Therefore, the number of steps heretofore required for positioning the film and bonding the plates together can be reduced.

A part of the light, which is incident on the first beam splitter film 9 and which transmits through this film 9, is used as monitor light for the light emitted from the light source 1.

The main beam and the side beams, reflected by the first beam splitter film 9, transmit through the surface 5e of the optical guide member 5, and pass through the objective lens 26 having a condensing effect so as to form image spots on an information recording surface 27a of the recording medium 27. At this time, image spots 29a and 29c of the two side beams are located substantially symmetrically with respect to each other about an image spot 29b of the main beam on the information recording surface 27a. The recording of information on the information recording surface 27a, and the reading of a reproduction signal and servo signals for tracking and focusing from the information recording surface 27a, are effected using the image spot 29b of the main beam and the image spots 29a and 29c of the side beams.

The return light, consisting of the main beam and the side beams reflected by the information recording surface 27a of the recording medium 27, again passes through the objective lens 26 and the surface 5f of the optical guide member 5, and is again incident on the first beam splitter film 9 formed on the second inclined surface 5b of the optical guide member 5.

That portion of the return light (from the recording medium 27) transmitted through the first beam splitter film 9 is incident on a second beam splitter film 11 having polarization selectivity (hereinafter referred to merely as "second beam splitter film"), the second beam splitter film 11 being formed on a third inclined surface 5c of the optical guide member 5 parallel to the first inclined surface 5a. The second beam splitter film 11, like the first beam splitter film 9, has substantially 100% transmittance for a P polarization component, and a predetermined reflectance for a S polarization component.

Of the light beam which is incident on the second beam splitter film 11, that portion (that is, transmitted light 117) which is transmitted through the second beam splitter film 11 will be explained. The transmitted light 117 is incident on a polarization plane conversion plate 31 bonded to the third inclined surface 5c.

Figure 5:
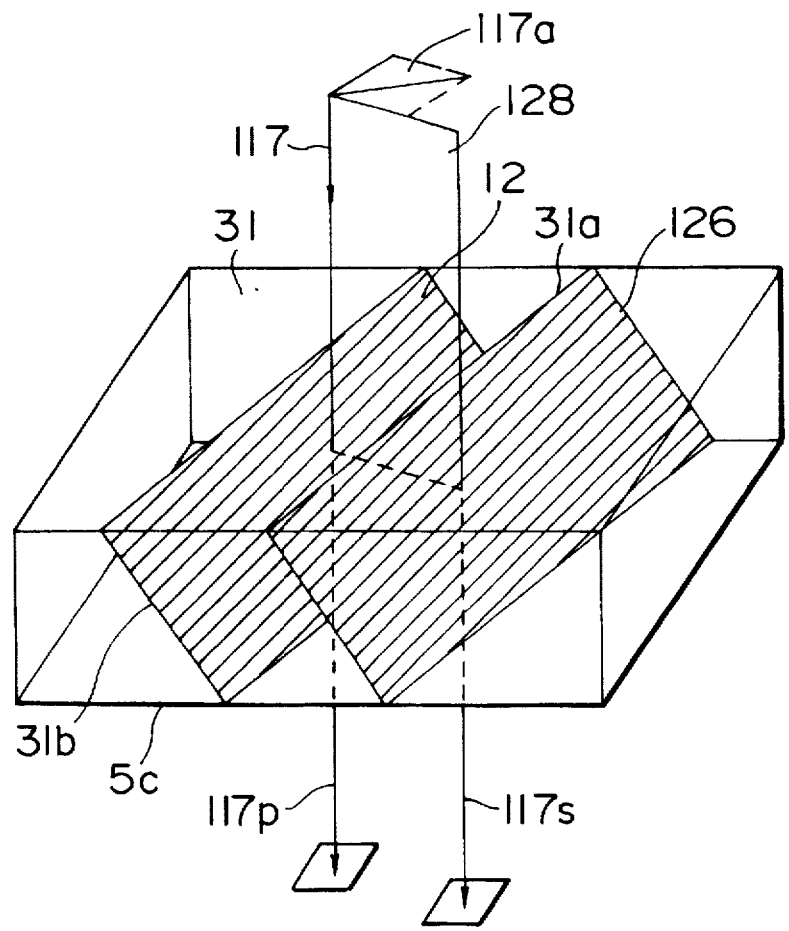
FIG. 5 is a perspective view showing a polarization plane conversion plate of the optical pickup of FIG. 1.

FIG. 5 is a perspective view of the polarization plane conversion plate of the invention, and FIG. 6 is a diagram showing the arrangement of the light-receiving portions, as well as the signal processing in the optical pickup of the invention. The polarization plane conversion plate 118 has a first inclined surface (hereinafter referred to as "first other inclined surface") 31a, and a second inclined surface (hereinafter referred to as "second other inclined surface) 31b parallel to the first other inclined surface 31a. A reflecting film 126 is formed on the first other inclined surface 31a, and a polarized light splitting film 12 is formed on the second other inclined surface 31b. The transmitted light 117 is incident on the polarized light splitting film 12 formed on the second other inclined surface 31b. The second other inclined surface 31b is so formed that the angle between a polarization plane 117a of the transmitted light 117 and a plane 128 of incidence thereof is about 45° (2n+1 where n is an integer). As a result, the intensity ratio of a P polarization component 117P of the transmitted light 117 to a S polarization component 117S thereof is substantially 1:1. The P polarization component 117P, having a polarization component parallel to the incidence plane 128, transmits substantially 100% through the polarized light splitting film 12, whereas the S polarization component 117S, having a polarization component perpendicular to the incidence plane 128, is reflected substantially 100% by the polarized light splitting film 12 formed on the second other inclined surface 31b, and then is incident on the first other inclined surface 31a, and then is reflected by the reflecting film 126 to the light-receiving element 13.

Next, explanation will be made of reflected light 123 (see FIG. 3) obtained from the light beam incident on the second polarization beam splitter film 11. The reflected light 123 is incident on an astigmatism-generating hologram 10 of the reflective type formed on the second inclined surface 5b. The reflected light 123 is reflected by the astigmatism-generating hologram 10 while producing astigmatism, and the return light of the main beam reaches a light-receiving sensor 172 (see FIG. 6) on the light-receiving element 13 via reflecting films 124 and 125 while the return light beams of the side beams reach light-receiving sensors 176 and 177 on the light-receiving element 13, respectively.

Second Embodiment

The operation of an optical guide member different in construction from that of the first embodiment will now be described with reference to the drawings. FIG. 7 is a side-elevational view of an embodiment of an optical pickup of the invention, and FIG. 8 is a plan view of the optical pickup of this embodiment.

In the optical pickup of this embodiment, a block 301, a sub-mount 302, a light source 303, a diffusion angle conversion hologram 306, a diffraction grating 307, an objective lens 309, a first beam splitter film 308, a second beam splitter film 316, a light-receiving element 319 and so on are arranged similarly as described above for the first embodiment, but instead of the polarization conversion plane plate of the first embodiment, a ½ wavelength plate 318 is bonded to a fourth inclined surface 305d of the optical guide member 304 parallel to a first inclined surface 305a, a second inclined surface 305b and a third inclined surface 305c.

In this embodiment, a path of light from the light source 303 to a recording medium 310, and an optical path from the recording medium 310 to the second beam splitter film 316 are similar to those described in the first embodiment. FIG. 9 is a diagram showing the arrangement of the light-receiving portions and the signal processing in the optical pickup of this embodiment. Transmitted light 317 from the second beam splitter film 316 is incident on the ½ wavelength plate 318 bonded to the fourth inclined surface 305d. The polarization direction of the transmitted light 317 is rotated 45° by the ½ wavelength plate 318, and is incident on a polarized light splitting film 321, formed on a fifth inclined surface 305e parallel to the fourth inclined surface 305d, as linearly polarized light which is 45° with respect to an incidence plane thereof, and its P polarization component transmits through the polarized light splitting film 321 whereas its S polarization component is reflected by the polarized light splitting film 321. The P polarization component, transmitted through the polarized light splitting film 321, reaches a light-receiving sensor 370. The reflected light 320, defined by the S polarization component reflected by the polarized light splitting film 321, is reflected by a reflecting film 322 on the third inclined surface 305c, and then transmits through the ½ wavelength plate 318, and then reaches a light-receiving sensor 371. RF signal is formed in accordance with signals from these light-receiving portions so as to reproduce information recorded on the recording medium.

With respect to the light beam incident on the second beam splitter film 316, reference is made to reflected light 323 reflected by the second beam splitter film 316. The reflected light 323 is incident on an astigmatism-generating hologram 324 of the reflective type formed on the second inclined surface 305b. The reflected light 323 is reflected by this hologram 324 while generating astigmatism, and then is reflected by a reflecting film 325 on the third inclined surface 305c, and then is reflected by a reflecting film 326 on the second inclined surface 305b. Thereafter, the return light of the main beam reaches a light-receiving portion 372 of the light-receiving element 319, and the return light beams of the side beams reach light-receiving portions 376 and 377, respectively. A focusing signal and a tracking signal are formed in accordance with signals from these light-receiving portions so as to control an actuator and so on.

Third Embodiment

A packaging construction of an optical pickup according to an embodiment of the invention will now be described with reference to the drawings. FIGS. 10 to 12 show the packaging construction of the optical pickup of this embodiment. However, with respect to those parts corresponding to those of the first embodiment, only those portions thereof having a different construction will be described.

A ceramics package 18 performs not only the function of the package 14 but also the function of the radiating plate 4 in the first embodiment. Therefore, the ceramics package 18 is preferably made of AlN or $Al_2O_3$ so that it can allow heat to efficiently escape. In this embodiment, although AlN having high thermal conductivity is used, $Al_2O_3$ is preferred from the viewpoint of the cost. The ceramics package 18 comprises three ceramics plates bonded or laminated together, and the three ceramics plates 18a, 18b and 18c are arranged in the downward sequence. Wiring patterns for transmitting electrical signals from a light-receiving element 13 and for supplying electric power to a light source 1 are printed on upper, lower and side surfaces (for example, through holes) of these plates 18a, 18b and 18c. Electrodes 18e, to which wires for feeding the electrical signals from the light-receiving element 13 are bonded, are exposed to the upper surface of the plate 18b, and a block 3 is fixedly secured to this upper surface by cream solder or the like. Through holes 19a, through holes 19b and through holes 19c are formed through the plates 18a, 18b and 18c, respectively. The through holes 19a, 19b and 19 may be arranged serially or at random in so far as they are electrically connected together. A thin film for power supplying purposes, which is made of a material with good electrical conductivity such as Au, is formed on an inner surface of each of the through holes 19a, 19b and 19c, and the upper surface of the plate 18a is electrically connected to the lower surface of the plate 18c through these thin films. Alternatively, the upper surface of the plate 18a may be electrically connected to the lower surface of the plate 18c by a method in which a paste of tungsten or the like is filled in the through holes 19, and this paste is calcined together with the material of the ceramics package 18. Also, there may be used a method in which the through holes 19 are not formed, and instead through holes, formed in the side surfaces of the ceramics package 18 when manufacturing this package 18, are used. In this case, the process of forming the through holes 19 is omitted. After the above various portions are formed, calcination or sintering is effected to produce the ceramics package 18.

Terminals 20 serve to supply electric power to the light source 1. The two terminals 20 are brazed at their one ends to electrodes on the lower surface of the plate 18c, respectively, and are electrically connected respectively to electrodes 18d, formed on the upper surface of the plate 18a, through the Au films on the inner surfaces of the through holes 19, pins, through holes and the like. The other ends of the terminals 20 are connected to a high-frequency superimposed power circuit 21 for supplying electric power to the light source 1.

For supplying electric power to the light source 1, the electrodes 18d, formed on the upper surface of the plate 18a, are wire-bonded to electrodes 2a which are formed on an upper surface of the sub-mount 2, and are electrically connected to an electrode (not shown) on an upper surface of the light source 1 and a lower surface of the light source 1.

A cap 22 is provided to cover an optical guide member 5, and prevents dirt, dust and the like from intruding into the package, thereby preventing the optical guide member 5, the light-receiving element 13 and other parts from being adversely affected. The cap 22 can be made of any suitable material, such as metal and a resin, in so far as it can be easily bonded to the ceramics package 18, and can maintain a stable configuration. Particularly when the cap 22 is made of metal, the cap 22 is expected to withstand unnecessary radiation from the high-frequency superimposed power circuit 21 and others, and therefore the cap 22 is preferably made of an alloy, such as Fe—Ni, Fe—Ni—Co, or metal such as Cu.

For purging the interior of the package in order to prevent the oxidation of the light source 1, a gap 17 between the optical guide member 5 and the ceramics package 18 is beforehand charged by a potting material or solder, or an opening formed in the bottom of the ceramics package 18 is closed, and thereafter the cap 22 is mounted in an atmosphere of anti-oxidant gas such as $N_2$ gas.

The connection between the cap 22 and the ceramics package 18 will now be described. Preferably, the cap 22 is fixedly secured directly to the ceramics package 18 by an epoxy adhesive or by soldering. More preferably, a ring 23 is interposed between the ceramics package 18 and the cap 22. With this arrangement, electric welding can be effected between the ceramics package 18 and the cap 22, and the joint portion has enhanced sealing properties, and besides when joining the package 18 and the cap 22 together, the temperature of the joint portion does not need to be made too high. The ring 23 is mounted on the uppermost plate 18a of the ceramics package 18, and has a substantially square ring-shape, and has a rectangular transverse cross-section. Preferably, the ring 23 is made of Fe—Ni—Co alloy, Fe—Ni alloy, or metal such as Cu. For connecting the ceramics package 18 and the ring 23 together, a metallized film of tungsten is formed on that surface of the ceramics package 18 which faces the ring 23, and this metallized film is plated with nickel, and this nickel-plated surface is joined to the ring 23 by Ag brazing or the like. Then, the ring 23, thus joined to the ceramics package 18, is plated with nickel, and then a film of Au is formed on this nickel-plated surface. That surface of the cap 22 to face the ring 23 is also plated with nickel, and thereafter the ring 23 and the cap 22 are connected together by a seam welder (which is a kind of electric resistance welding device).

In the above packaging structure, thanks to the provision of the ceramics package 18 having the function of a radiating plate, heat, generated by the light source 1, can be radiated to the exterior more efficiently. Since the terminals 20 are provided at the lower portion of the ceramics package 18, the distance required for connecting the light source 1 and the high-frequency superimposed power circuit 21 can be reduced, and therefore unnecessary radiation from the high-frequency superimposed power circuit through the associated power lines and signal lines can be suppressed. When the cap 22 is made of metal, the unnecessary radiation can be further suppressed.

In this embodiment, although the block 3 and the optical guide member 5 are bonded together to form an integral or unitary structure, the two may be mounted on the ceramics package 18 separately from each other, in which case the optical guide member 5 and the light-receiving element 13 can be easily positioned with respect to each other. In this embodiment, although the light-receiving element 13 is mounted on the bottom of the optical guide member 5, it may be mounted on the ceramics package 18 in so far as the optical characteristics are not affected. In this embodiment, although the ceramics package 18 is formed by bonding or laminating the three plates together to provide the three-layer structure, the ceramics package 18 may be of a one-layer construction or a two-layer construction. For manufacturing reasons, the ceramics package may be formed by four or more layers.

Fourth Embodiment

A packaging construction of an optical pickup according to an embodiment of the invention will now be described with reference to the drawings. However, with respect to those parts corresponding to those of the first, second and third embodiments, only those portions thereof having a different construction will be described.

FIGS. 13 to 15 show the packaging construction of the optical pickup of this embodiment.

A stem 24 supports or mounts a light source, a sub-mount 2, an optical guide member 5 and others, and is made of a material with high thermal conductivity so that it can allow heat, generated by the light source 1 and others, to escape efficiently. Preferably, the stem 24 is made of an alloy such as Fe—Ni—Co alloy and Fe—Ni alloy, or a ceramics material such as $AlO_3$ and AlN. In this embodiment, Fe—Ni—Co alloy is used. The optical guide member 5 is mounted on a side surface portion 24a. If the side surface portion 24a of the stem 24 is inclined with respect to the optical axis of a light beam emitted from the light source 1, the optical guide member 5 is mounted in inclined relation to the intended optical axis, and therefore optical aberration increases, so that the light can be not detected properly. Therefore, this side surface portion 24a is required to have a high degree of perpendicularity and flatness. Here, preferably, the inclination of the side surface portion 24a with respect to the optical axis of the light beam emitted from the light source 1 is 90°×0.5°.

In this embodiment, in order to achieve such precise working, the side surface portion 24a of the stem 24 is precisely worked or processed by an end mill. Preferably, the area (S) of contact between the stem 24 and the optical guide member 5 is more than 1 $mm^2$ (S>1 $mm^2$) With such a construction, the stem 24 and the optical guide member 5 can be firmly bonded together, and even if large vibrations are transmitted from the stem 24 to the optical guide member 5, the optical guide member 5 will not be disengaged from the stem 24. The optical guide member 5 may be bonded to a side surface portion of a block 3 mounted on the stem 24.

Stepped portions 24b are formed on an upper side of the peripheral surface of the stem 24, and a cap 22 is fittingly attached to these stepped portions 24b in such a manner that an inner surface of the cap 22 is held in intimate contact with two side walls or surface of each stepped portion 24b. Although a method of securing the cap 2 to the stem 24 may vary depending on the material of the stem 24, they can be fixedly connected together usually by electric resistance welding (for joining metal parts together) as described above for the connection between the ring 23 and the cap 22 (see FIG. 10), or by the use of an epoxy adhesive or a UV-curing adhesive, or by brazing or soldering.

A lead frame 14a, a light-receiving element 13, Au wires connecting (wire-bonding) the light-receiving element 13 to the lead frame 14a, and so on are molded in a package 25. The light-receiving element 13 made of Si must be molded in the package 25, and the package 25 must guide light, transmitted through the optical guide member 5, to the light-receiving element 13, and therefore in view of these the package 25 is preferably made of a material which is close in linear expansion coefficient to Si, has a low water absorption coefficient, is transparent, and has stable optical characteristics such as transmittance and a refractive index. Here, a urethane resin is used. Then, the package 25 and the stem 24 are connected or joined together. At this time, for optical reasons, a variation of the distance between the optical guide member 5 and the light-receiving element 13 should preferably be not more than 50 μm. However, this adjustment may be effected by mounting the optical guide member 5 directly on the package 25 or by adjusting the height of a side wall portion 25a of the package 25. The package 25 and the stem 24 can be joined together by an epoxy adhesive, a UV-curing adhesive, or cream solder.

As described above, in this embodiment, the sub-mount 2 is mounted directly on the stem 24, and with this construction the heat, transferred from the light source 1 by conduction, can be efficiently transferred to the stem 24, thus solving the thermal problem. The light-receiving element 13 is molded in the package 25, and therefore the light-receiving element 13 is prevented from oxidation upon contact with the air, and also dirt and the like will not deposit on the light-receiving element 13, and therefore its light-receiving characteristics will not be degraded.

Instead of molding the light-receiving element 13 in the package 25, the light-receiving element 13 may be fixedly mounted on the package 25 as in the first embodiment, or may be mounted on the bottom of the optical guide member 5. In this case, the package 25 can be made of a colored material, and therefore an inexpensive epoxy resin or the like can be used for forming the package 25. When the interior of the packaging structure is to be purged in order to prevent oxidation of the light source 1, a gap between the optical guide member 5 and the stem 24 is beforehand charged by a sealing material, and then the cap 22 is fixedly secured in an atmosphere of anti-oxidant gas such as $N_2$ gas.

Fifth Embodiment

A fifth embodiment of an optical pickup of the invention will now be described with reference to FIGS. 16 to 18. However, with respect to those parts corresponding to those of the first embodiment, only those portions thereof having a different construction will be described.

A base plate 404 serves to radiate heat, which is generated by a light source 1, and is transferred to the base plate 404 through a sub-mount 2 and a block 3 by conduction, to the exterior, and the base plate 404 also serves as a base for the packaging on which the various parts, constituting the optical pickup, are mounted. Preferably, the base plate 404 is made of a material with high thermal conductivity, and more specifically made of metal, such as Cu, Al and Fe, or an alloy such as Fe—Ni alloy and Fe—Ni—Co alloy. The reason for this is that welding can be easily effected as describe later, and that the base plate 404 made of such a material serves as an electromagnetic shield for interrupting noises such as electromagnetic waves from a high-frequency superimposed circuit. Among these, Fe, Fe—Ni alloy and Fe—Ni—Co alloy are particularly preferred since they have a low thermal resistance and good heat-radiating properties, and are inexpensive, and therefore the base plate 404, made of any of these materials, can efficiently radiate the heat, generated by the light source 1, to the exterior, and besides the optical pickup, having good characteristics of the light from the light source, can be provided at low costs.

An opening 404a is formed through the base plate 404, and a jig can be inserted through this opening 404a for adjusting the position of the members. With this arrangement, the members in the optical pickup which must be delicately positioned can be easily positioned.

Next, the members mounted on the base plate 404 will be described. Reference is first made to the mounting of the block 3 on the base plate 404. The block 3, having the sub-mount 2 and the light source 1 beforehand mounted thereon, is fixedly mounted on an upper surface of the base plate 4 by brazing or by a solder foil.

Pins 414 are mounted on the base plate 404. These pins 414 serve to feed electric power to the light source 1 and also to output detected signals to the exterior. The pins 414 are inserted respectively in a plurality of holes 404b, formed through the base plate 404 made of the above-mentioned metal material, in such a manner that the pins 414 are kept out of electrical contact with the base plate 404. Preferably, the pin 414 is made of Fe—Ni—Co alloy, Fe—Ni alloy and Fe—Cr alloy. A preferred method of electrically isolating the pins 414 from the base plate 404 is to form an electrically-insulating film or the like at that portion of contact between each pin 414 and the base plate 404, and it is necessary to seal these contact portions so that the ambient air will not intrude therethrough. For this purpose, it is preferred to use a material capable of effecting both the insulation and sealing at the same time, such as a hermetic seal. Here, it is particularly preferred to use a hermetic seal of the matching seal-type or the compressive-seal type. By using such a hermetic seal, the insulation and sealing can be effected quite easily, and besides since such a hermetic seal is very inexpensive, the process of mounting the pins 414 on the base plate 404 can be simplified, and the manufacturing cost of the optical pickup can be reduced.

Referring to the construction of such a hermetic seal of the matching seal-type, an insulating material 421 is filled in a metal ring 420 made of Fe—Ni—Co alloy or the like, and then a lead pin 422, serving as the terminal or pin 414, is passed through the metal ring 420, as shown in FIG. 18. Here, in view of temperature rise due to the heat from the light source 1, the lead pin 422 is preferably made of Fe—Ni—Co alloy which has substantially the same expansion coefficient as that of glass (of which the insulating material 421 is made) up to a temperature of about 500° C.

By thus using this hermetic seal of the matching seal-type on the terminal 414, the high hermetic property and insulating property can be maintained over a wide range of temperatures, and besides the terminal 414 can be relatively easily bent or deformed into a desired shape, and therefore the reliability of the optical pickup can be enhanced, and also the degree of freedom of the design can be rendered high.

A cap 415 is joined to the base plate 404 in such a manner that it -covers the light source 1, an optical guide member 5, a light-receiving element 13 and so on. Thus, the cap 415 prevents the light source 1, the optical guide member 5, the light-receiving element 13 and so on from making direct contact with the ambient air and moisture, and also prevents external light from intruding into the optical pickup, thus preventing such light from causing noises. Usually, the cap 415 has a dome-shape or a silk hat-shape, and an opening 415a is formed through that portion of the cap 415 through which light passes, so that the passing light will not be adversely affected. Preferably, the cap 415 is made of metal or a resin, and can be easily joined to the base plate 404, and can maintain a stable configuration. Particularly when the cap 415 is made of metal, unnecessary radiation from a power circuit for supplying electric power to the light source 1, as well as noises from a high-frequency superimposed circuit, can be suppressed. Therefore, noises due to these factors will not be superimposed on various electrical signals outputted from the optical pickup, so that there can be provided the high-performance optical pickup in which noises are kept to a low level. Among the materials used for forming the cap 415, Fe—Ni—Co alloy, Fe—Ni alloy or the like are particularly preferred since these facilitate the formation of the cap 415, and suppress unnecessary radiation quite effectively, and can be satisfactorily joined to the base plate 404.

With the above construction, the thermal resistance of the base plate 404 and the cap 415 can be made smaller than those in the conventional construction, and therefore the heat, generated by the light source 1, can be more easily radiated to the exterior as compared with the conventional construction. And besides, since a clearance required for joining the cap 415 to the base plate 404 is very small, the base plate 404 and the cap 415 can be formed into a small size, and there can be provided the optical pickup meeting with the commercial need. Furthermore, since the base plate 404 and the cap 415 are made of the metal material, the whole of the package except a cover member 16 is at the ground level, and therefore there is produced a strong shield effect against electromagnetic waves from the high-frequency superimposed circuit and others. Therefore, the optical pickup is highly resistant to noises such as electromagnetic waves, and hence is highly reliable.

Sixth Embodiment

An embodiment of an optical pickup of the invention designed for a phase change-type optical disk will now be described with reference to the drawings. However, with respect to those parts corresponding to those of the first embodiment, only those portions thereof having a different construction will be described.

In a phase change-type optical disk, the crystal structure in a recording medium is changed upon application of light, thereby recording information, and since the crystal structure is thus changed, an optical unit for use with the phase change-type optical disk need a larger amount of light than the conventional optical recording/reproducing unit, and therefore need an optical system of higher efficiency. FIG. 19 is a view showing the construction of the optical pickup of the invention designed for the phase change-type optical disk.

A laser beam, emitted from a light source 1 enters an optical guide member 41, having a plurality of inclined surfaces, through a surface 41f thereof, and goes out of a surface 41e of the optical guide member 41 via a diffusion angle conversion hologram 7, a diffraction grating 6 and a beam splitter film 35 having polarization selectivity (hereinafter referred to as "beam splitter film"). In contrast with the first embodiment, the reflectance of the beam splitter film 35 for a S polarization component is not less than 95%, and its reflectance for a P polarization component is about 1%. A part (which is the P polarization component, and is about several percent of the total light amount) of the light, which is incident on the beam splitter film 35 and which transmits through this film 35, is used as monitor light for the light emitted from the light source 1. The light, going out of the surface 41e of the optical guide member 41, transmits through a λ/4 plate 33 mounted on a cover member 16. FIG. 20 is a view showing the appearance of the λ/4 plate 33 in the invention. An abnormal optical axis of the λ/4 plate 33 is arranged in a direction π/4·(2m−1) (where m is natural number; This is the same in the following) with respect to a polarization plane of the incident light from the optical guide member 41, and the λ/4 plate 33 has the function of producing a phase difference of π/2·(2m−1) between an abnormal light component and a normal light component of the incident light. The λ/4 plate 33 is usually made of a uniaxial crystal material. Above all, quarts crystal, which is excellent in light transmittance, is most preferred. Uniaxial crystal has an abnormal optical axis 616 and a normal optical axis 617, and has different refractive indexes (called an abnormal light refractive index $n_e$ and a normal light refractive index $n_o$) respectively for these two optical axes. Since abnormal light and normal light are different in optical distance from each other, there is produced a phase difference Δ expressed by the following formula in which QD represents the thickness of the λ/4 plate 33, and λ represents the wavelength of the incident light. The thickness QD of the λ/4 plate 33 is so determined that this phase difference becomes π/2·(2m−1).

$$\Delta = 2\pi \cdot (n_e - n_o) \cdot QD/\lambda$$

In this embodiment, if the wavelength λ is 790 mm, the abnormal light refractive index $n_e$ is 1.5477, and the normal light refractive index $n_o$ is 1.5388 (However, the refractive indexes vary depending on the angle of cut-out of the plate. Here, the plate is cut out parallel to a plane including both the abnormal optical axis and the normal optical axis), the thickness of the λ/4 plate 33 is 21.9·(2m−1) μm. By satisfying these conditions, the linearly polarized light incident at an incidence angle of 0° can be converted into circularly polarized. Namely, the linearly polarized light (emitted from the light source 1) containing only the S polarization component can be converted into the circularly polarized light. In the embodiment, the λ/4 plate 33 of quartz crystal having a thickness of 21.9 μm is mounted on the cover member 16, the λ/4 plate 33 may be mounted on the surface 41e of the optical guide member 41 or an objective lens 26.

The light, transmitted through the λ/4 plate 33 to be converted into the circularly polarized light, further passes through the objective lens 26, having a condensing effect, to form image spots on an information recording surface 27a of the recording medium 27, and is reflected by this recording surface 27. Since the rotation direction of the circularly polarized light, reflected by the information recording surface 27a, is inverted, the return light again passes through the objective lens 26, and is converted into linearly polarized light containing only a P polarized component when again passing through the λ/4 plate 33. The thus converted return light again transmits through the surface 41e of the optical guide member 41, and is again incident on the beam splitter film 35 formed on a second inclined surface 41b of the optical guide member 41. As described above, the beam splitter film 35 has substantially 100% transmittance for the P polarization component, and also has substantially 100% reflectance for the S polarization component. Therefore, the return light, containing only the P polarization component, substantially transmits through the beam splitter film 35.

Then, the return light is incident on a half mirror 34 formed on a third inclined surface 41c of the optical guide member 41 parallel to a first inclined surface 41a. The half mirror 34 reflects a predetermined amount of this incident light, and allows the remainder to transmit therethrough.

That portion (reflected light 117) of the light beam which transmits through the half mirror 34 is directed to a light receiving portion 37.

That portion (reflected light 123) of the light beam which is reflected by the half mirror 34 (see FIG. 19) will now be described. FIG. 21 is a diagram showing the arrangement of light-receiving portions of a light-receiving element provided in the optical pickup of the invention designed for the phase change-type optical disk. The reflected light 123 is incident on an astigmatism-generating hologram 10 of the reflective type formed on the second inclined surface 41b. The reflected light 123 is reflected by the astigmatism-generating hologram 10 while generating astigmatism, and is then reflected sequentially by a reflecting film 124 and a reflecting film 125, and the return light of the main beam reaches a light-receiving portion 38 on the light-receiving element 36 while the return light beams of the side beams reach light-receiving portions 39 and 40 on the light-receiving element 36, respectively.

In the optical pickup of the above construction, the λ/4 plate 33 is provided between the beam splitter film 35 and the recording medium 27, and the emitted light, that is, the linearly polarized light composed of the S polarization component, is converted by this λ/4 plate 33 into the circularly polarized light. Then, the circularly polarized light, reflected by the recording medium 27 to be inverted with respect to the rotation direction, is converted by the λ/4 plate 33 into the linearly polarized light containing only the P polarization component, and then this linearly polarized light is incident on the beam splitter film 35. With this arrangement, substantially 100% of the light, reflected by the recording medium 27, can be directed onto the light-receiving element 36, and therefore the reflectance of the beam splitter film 35 for the S polarization component can be greatly increased, so that the amount of the light to be applied to the recording medium 27 can be increased. Namely, the limited output of the light source 1 can be efficiently applied to the recording medium 27, and also the reflected light from the recording medium 27 can be efficiently guided to the light-receiving element 36.

The above six embodiments can be suitably combined. For example, in the first embodiment, the light-receiving element, instead of being bonded to the optical guide member 5, may be molded in the package as in the second embodiment. Also, the whole of the package may be covered using the stem 24 of metal and the cap 22 of metal as in the third embodiment.

What is claimed is:

1. An integrated type optical pickup comprising:
   a light source for irradiating light onto a medium;
   light-receiving means for receiving a portion of the light from the medium and for converting the portion of the light into an electrical signal;
   a packaging member having an interior and an opening for passing the light, the packing member containing said light source and said light-receiving means in said interior;
   a light transmissive member covering said opening, said interior of the packaging member being sealed in a gas-tight manner; and
   gas charged in the interior of said packaging member at a pressure of 0.5 to 1.5 atm.

2. An integrated type optical pickup as set forth in claim 1, wherein said light source and said light-receiving means are arranged on substantially different planes within said interior of said packaging member.

3. An integrated type optical pickup as set forth in claim 1, wherein said gas charged in said interior of said packaging member comprises at least one of dry air and an inert gas.

4. An integrated type optical pickup as set forth in claim 1, wherein said light transmissive member is pressed against the packaging member by the pressure of said gas charged in the interior of the packaging member.

5. An integrated type optical pickup as set forth in claim 1, further comprising a light source holding member to which the light source is attached, the light source holding member comprising electrodes for feeding electric power to said light source.

6. An integrated type optical pickup comprising:
   a light source for irradiating light onto a medium;
   light-receiving means for receiving a portion of the light from the medium and for converting the portion of the light into an electrical signal;
   a packaging member having an interior and an opening for passing the light, the packaging member containing said light source and said light receiving means in said interior;
   a guide member, secured to said packaging member, for guiding the light emitted from said light source to a first predetermined position on the medium and for guiding the portion of the light from the medium to a second predetermined position on the light-receiving means;
   a light transmissive member covering said opening, said interior of the packaging member being sealed in a gas-tight manner; and
   gas charged in the interior of said packaging member at a pressure of 0.5 to 1.5 atm.

7. An integrated type optical pickup as set forth in claim 6, wherein said guide member is formed with a plurality of inclined surfaces and comprises a plurality of optical elements on the inclined surfaces for guiding the light emitted from the light source to the first predetermined position and for guiding the portion of the light from the medium to the second predetermined position.

8. An integrated type optical pickup as set forth in claim 7, wherein at least one of said plurality of optical elements comprises a light splitter.

9. An integrated type optical pickup as set forth in claim 6, wherein said guide member comprises a reflection-preventing element.

10. An integrated type optical pickup comprising:
    a light source for irradiating light onto a medium;
    first and second light-receiving means for receiving first and second portions of the light received from the medium and for converting the first and second portions of the light into first and second electrical signals;
    a packaging member having an interior and an opening for passing the light, the packaging member containing said light source and said first and second light-receiving means in said interior;

a guide member, secured to said packaging member, for guiding said light from said light source to a first predetermined position on the medium and for guiding the first and second portions of the light received from the medium to second predetermined positions on the first and second light-receiving means;

a light transmissive member covering said opening, said interior of the packaging member being sealed in a gas-tight manner;

gas charged in the interior of said packaging member at a pressure of 0.5 to 1.5 atm; and error signal deriving means for deriving from the first and second electrical signals a focus error signal, a tracking error signal and an RF signal.

11. An integrated type optical pickup comprising:

a light source for irradiating light into a medium;

first and second light-receiving means for receiving first and second portions of the light from the medium and for converting the first and second portions of the light into first and second electrical signals;

a packaging member having an interior and an opening for passing light, the packaging member containing said light source and said first and second light-receiving means in the interior;

a guide member secured to said packaging member for guiding the light from the light source to a first predetermined position on the medium and for guiding the first and second portions of the light from the medium to second predetermined positions on the first and second light-receiving means, the guide member comprising a light splitting means for splitting the light received from the medium into the first and second portions and for causing the first and second portions to be incident upon said first and second light receiving means, respectively;

a light transmissive member covering said opening, said interior of the packaging member being sealed in a gas-tight manner;

gas charged in the interior of said packaging member at a pressure of 0.5 to 1.5 atm; and error signal deriving means for deriving, from said first electrical signal, at least one of a focus error signal and a tracking error signal, and for deriving, from the second electrical signal, at least an RF signal.

12. An integrated type light optical pickup as set forth in claim 11, wherein each of said first and second light receiving means comprises a plurality of light receiving parts.

* * * * *